United States Patent
Jernigan, IV et al.

(10) Patent No.: US 11,442,916 B2
(45) Date of Patent: Sep. 13, 2022

(54) FLAT OBJECT STORAGE NAMESPACE IN AN OBJECT STORAGE SYSTEM

(71) Applicant: NetApp, Inc., Sunnyvale, CA (US)

(72) Inventors: Richard Parvin Jernigan, IV, Sewickley, PA (US); Roger Warren Cox, Los Altos, CA (US)

(73) Assignee: NETAPP, INC., San Jose, CA (US)

(*) Notice: Subject to any disclaimer, the term of this patent is extended or adjusted under 35 U.S.C. 154(b) by 124 days.

(21) Appl. No.: 16/853,980

(22) Filed: Apr. 21, 2020

(65) Prior Publication Data
US 2021/0326319 A1    Oct. 21, 2021

(51) Int. Cl.
*G06F 16/22* (2019.01)
*G06F 16/2455* (2019.01)
*G06F 16/182* (2019.01)
*G06F 16/28* (2019.01)
*G06F 16/16* (2019.01)

(52) U.S. Cl.
CPC ........ *G06F 16/2282* (2019.01); *G06F 16/162* (2019.01); *G06F 16/182* (2019.01); *G06F 16/24552* (2019.01); *G06F 16/24554* (2019.01); *G06F 16/28* (2019.01)

(58) Field of Classification Search
CPC .. G06F 16/162; G06F 16/182; G06F 16/2282; G06F 16/24552; G06F 16/24554; G06F 16/28
See application file for complete search history.

(56) References Cited

U.S. PATENT DOCUMENTS

| | | | | |
|---|---|---|---|---|
| 6,405,198 | B1 * | 6/2002 | Bitar | G06F 16/2282 |
| 8,312,046 | B1 * | 11/2012 | Eisler | G06F 16/2282 |
| | | | | 707/790 |
| 9,009,112 | B2 * | 4/2015 | Denuit | G06F 16/278 |
| | | | | 707/634 |
| 9,110,910 | B1 * | 8/2015 | Li | G06F 11/1448 |
| 9,183,200 | B1 * | 11/2015 | Liu | G06F 16/2282 |
| 10,592,475 | B1 * | 3/2020 | Ghidireac | G06F 16/14 |
| 2013/0218934 | A1 * | 8/2013 | Lin | G06F 16/182 |
| | | | | 707/828 |
| 2016/0266978 | A1 * | 9/2016 | Regni | G06F 16/27 |
| 2017/0140021 | A1 * | 5/2017 | Gopi | G06F 16/278 |
| 2020/0065293 | A1 * | 2/2020 | Wideman | G06F 16/13 |
| 2021/0216513 | A1 * | 7/2021 | Bajpai | G06F 3/0604 |

FOREIGN PATENT DOCUMENTS

CN          105045877 A    * 11/2015

* cited by examiner

*Primary Examiner* — James E Richardson
(74) *Attorney, Agent, or Firm* — Haynes and Boone, LLP

(57) ABSTRACT

A system, method, and machine-readable storage medium for maintaining an object storage system data are provided. In some embodiments, an object manager may receive a request to perform an operation on an object. The object storage system includes a first database of a first type and a second database of a second type. The object manager may identify a first record stored in the first database. The first record includes a name marker indicating a range of object names covered by the second database and includes a file handle referencing the second database. The range of object names includes the object name. Additionally, the object manager may identify a second record stored in the second database. The second record includes the object name and includes a file handle referencing the object. The object manager may perform the operation on the object in accordance with the request.

20 Claims, 9 Drawing Sheets

FLAT OBJECT STORAGE NAMESPACE IN AN OBJECT STORAGE SYSTEM

TECHNICAL FIELD

The present description relates to maintaining an object namespace, and more specifically, to a system, method, and machine-readable storage medium for maintaining objects and their object names in a distributed storage system for cost savings, efficiency, and/or load balancing.

BACKGROUND

Networks and distributed storage allow data and storage space to be shared between devices located anywhere a connection is available. These implementations may range from a single machine offering a shared drive over a home network to an enterprise-class cloud storage array with multiple copies of data distributed throughout the world. Larger implementations may incorporate Network Attached Storage (NAS) devices, Storage Area Network (SAN) devices, and other configurations of storage elements and controllers to provide data and manage its flow. Storage nodes or servers in storage networks generally store data across multiple data storage devices that together include a data container, which may also be referred to herein as an aggregate. Storage nodes may employ various forms of local data storage devices, such as hard disk drives, solid state drives, flash drives, or tape devices, as well as remote data storage devices, such as cloud storage devices or repositories, for example.

The data storage devices may host one or more data stores or volumes within the aggregates, which are associated with file systems that define an overall logical arrangement of storage space in a storage network. Clients may store content in a distributed storage system. For example, a client may store hundreds, thousands, or millions (or more) of objects in the distributed storage system. Objects may be identified by their names, and the distributed storage system may also store object names of the objects. As the number of objects stored in the distributed storage system continues to grow, it may be difficult to store the objects and their names in an efficient manner. For example, if a single database stores a collection of the object names, all namespace requests may be transmitted to the single database, potentially creating an access bottleneck for these requests. Additionally, the single database may serve as a single point of failure if the system crashes. Current approaches have limitations in their ability for maintaining objects and their object names in a distributed storage system.

BRIEF DESCRIPTION OF THE DRAWINGS

The present disclosure is best understood from the following detailed description when read with the accompanying figures.

DETAILED DESCRIPTION

Figure 1:
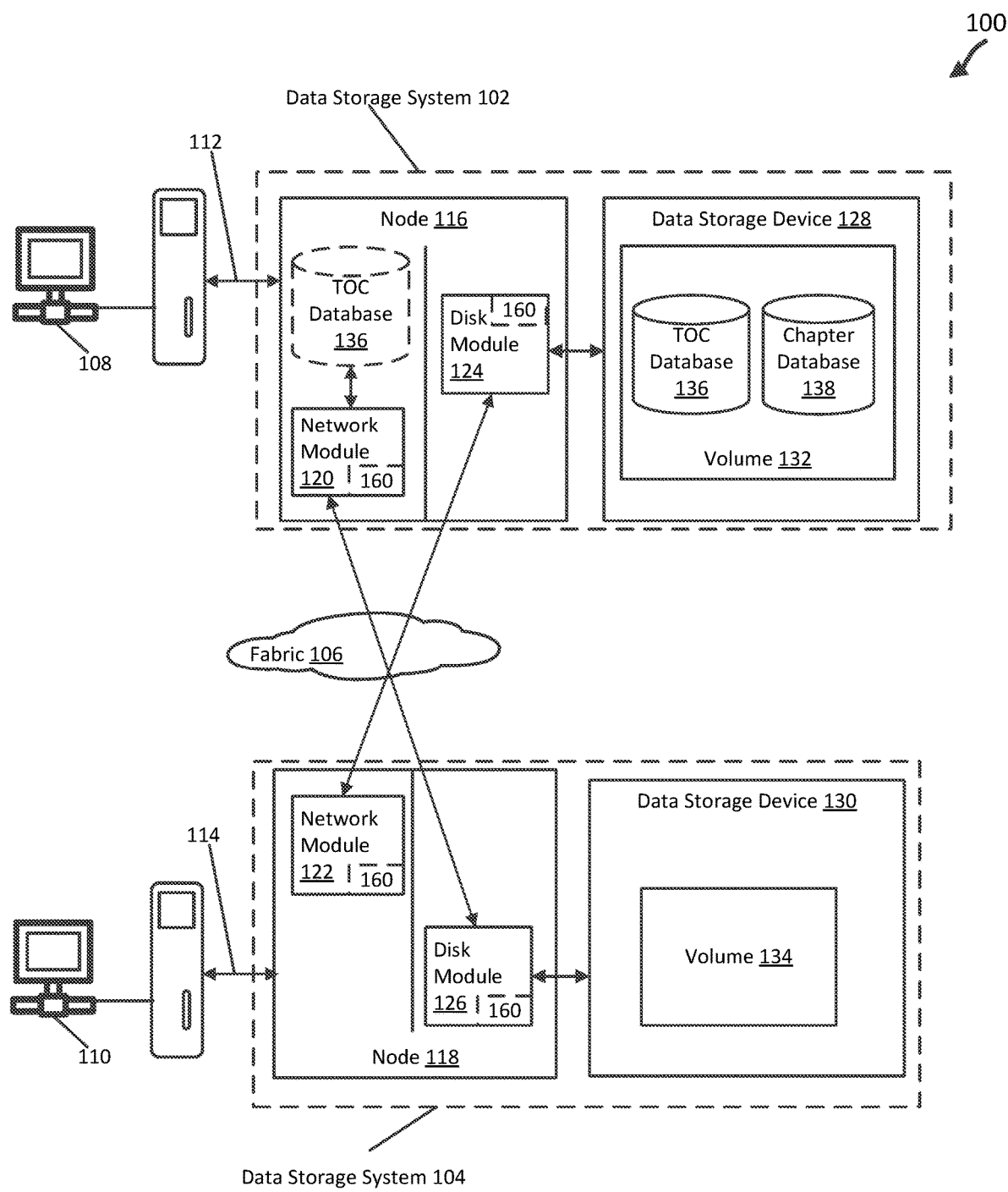
FIG. 1 is a block diagram illustrating a clustered network environment in accordance with one or more aspects of the present disclosure.

All examples and illustrative references are non-limiting and should not be used to limit the claims to specific implementations and embodiments described herein and their equivalents. For simplicity, reference numbers may be repeated between various examples. This repetition is for clarity only and does not dictate a relationship between the respective embodiments, unless noted otherwise. Finally, in view of this disclosure, features described in relation to one aspect or embodiment may be applied to other disclosed aspects or embodiments of the disclosure, even though not specifically shown in the drawings or described in the text.

Network attached storage (NAS) protocols (e.g., Network File System (NFS) protocol, Common Internet File System (CIFS) protocol, and the like) organize content in terms of files and directories. A directory may contain both files and subdirectories, which may themselves contain files and subdirectories. Further, a root directory may contain the top level and indicate a NAS namespace. For example, a caller may reach any file by specifying the names of the series of directories (starting at the root) that lead to where the file's own name is kept, and then finally the filename itself leads to the content. Additionally, a caller may rename files and directories—essentially rearranging the namespace while leaving the content itself largely unchanged.

Object storage, on the other hand, may implement a different way of organizing its content. For example, an object storage environment typically does not contain directories or files. Instead, the object storage environment may include objects, and each object is given a name which is unique within the entire object namespace or a bucket, which may refer to a discrete container that stores a collection of objects. For example, object names do not contain any sort of implicit hierarchy. In this example, the NAS-familiar character '/' (if it appears at all) is no different from any other letter or digit.

Customers may store objects in an object storage system and access the objects based on their object names. The object storage system may store hundreds, thousands, millions, or billions of objects and their object names. An object stored in the object storage system may be identified by its object name (rather than by, for example, a directory). A single database may store the collection of object names and reside on one machine. The single database, however, may be a single point of failure and/or a performance bottleneck for accessing objects in the object storage system.

It may be desirable for workloads in the object storage system to be distributed across the cluster. Additionally, it may be desirable for common object-storage protocols to efficiently respond to requests that specify a full object name (e.g., a request "Create an object named 'xyz' and put a first set of data in the object," a request "Read the data in object 'abcd' and provide a response with the read data", and the like). These protocols may expect to be able to iterate the namespace, starting at any filename and proceeding in a predetermined (e.g., alphabetical) order. Additionally, it may be desirable for an object storage system (e.g., for an enterprise-scale product) to manage object counts in the hundreds of billions (or more), maintaining both the objects themselves and their namespace. For example, it may be desirable for the namespace to remain constantly sorted and rapidly accessible for lookup, create, delete, and enumeration operations.

The present disclosure provides techniques for efficiently identifying a location at which a given object's name is stored (if at all) in the object storage system along with its content. As will be discussed further below, a table-of-contents (TOC) database may reference one or more chapter databases, where a collection of the one or more chapter databases serve a lookup workflow for identifying a particular object name out of potentially hundreds, thousands, millions, or billions of object names stored in the object storage system. A top-level TOC database may encode the top levels of a namespace lookup tree, providing a mapping table that demonstrates which chapters are responsible for which portions of the overall namespace. Records included in the TOC database may provide a key (name marker) to value (chapter database identity) mapping.

Hierarchically below the TOC database may be a collection of chapter databases, which may include at least one chapter database (up to millions). The collection of chapter databases may include separate, but related, chapter databases that collectively act as a larger namespace. The collection of chapter databases may enumerate the object names in sorted order. For example, each chapter database covers all object names that are stored within a discrete range of the collective namespace and maps each known object name to a location in the cluster where the corresponding object is stored. The collection of chapter databases may allow efficient storage of object names in a sorted order and maintenance of objects in the object storage system.

Each of the TOC and chapter databases operates with a large amount of independence from its peers. For example, chapter databases may answer create, delete, and enumeration queries typically without stalling to disclose what their peers are processing. In this way, the collective namespace may be stored using a wide array of independent databases stored on multiple volumes, and together they can service an enormous amount of namespace traffic in parallel. Each database may be responsible for its own integrity and its own resiliency in the face of service outages. In some examples, the TOC database may be internally replicated (e.g., identical copies are stored on multiple volumes for redundancy), while the chapter databases are not (for performance), though other configuration choices may be implemented based on different requirements.

Additionally, the collection of chapter databases may be stored on different machines or nodes to avoid having a single point of failure and performance bottleneck when attempting to access the chapter databases. An advantage of distributing the collection of chapter databases on different machines or nodes may provide opportunities to distribute or re-distribute the workload over time. For example, if a chapter database is created, it may be desirable to store the chapter database at an underutilized volume to increase its activity and assist in processing the workload. Accordingly, requests to perform operations on objects may be balanced across the clustered network environment 100. The chapter databases may be implicitly and/or continually distributed among a collection of nodes, which can then operate more or less independently for most of the traffic.

Additionally or alternatively, using the TOC database and chapter databases may advantageously provide for breaking up the responsibility for tracking billions of objects into a collection of small chapter databases. Accordingly, rather than funnel each namespace request to a single database, the namespace requests may be distributed across the object storage system.

FIG. 1 is a block diagram illustrating a clustered network environment 100 in accordance with one or more aspects of the present disclosure. The clustered network environment 100 includes data storage systems 102 and 104 that are coupled over a cluster fabric 106, such as a computing network embodied as a private InfiniBand, Fiber Channel (FC), or Ethernet network facilitating communication between the data storage systems 102 and 104 (and one or more modules, components, etc. therein, such as, nodes 116 and 118, for example). For example, the data storage systems 102 and 104 may be coupled via an internal switch (e.g., networking switch). The data storage systems 102 and 104 may be computing devices that interact with other components via, for example, the cluster fabric 106. It will be appreciated that while two data storage systems 102 and 104 and nodes 116 and 118 are illustrated in FIG. 1, any suitable number of such components is contemplated.

In an example, nodes 116, 118 include storage controllers (e.g., node 116 may include a primary or local storage controller, and node 118 may include a secondary or remote storage controller) that provide client devices, such as host devices 108 and 110, with access to data stored within data storage devices 128 and 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in an embodiment, a clustered network can be distributed over a plurality of storage systems and/or nodes located in a plurality of geographic locations; while in an embodiment a clustered network can include data storage systems (e.g., 102, 104) residing in a same geographic location (e.g., in a single onsite rack of data storage devices).

In the example illustrated in FIG. 1, one or more host devices 108, 110 which may include, for example, client devices, personal computers (PCs), computing devices used for storage (e.g., storage servers), and other computers or peripheral devices (e.g., printers), are coupled to the respective data storage systems 102, 104 by storage network connections 112, 114. A network connection 112, 114 may include a local area network (LAN) or wide area network (WAN), for example, that utilizes NAS protocols, such as a CIFS protocol or an NFS protocol to exchange data packets, a Storage Area Network (SAN) protocol, such as Small Computer System Interface (SCSI) or Fiber Channel Protocol (FCP), an object protocol, such as AMAZON S3®, etc.

The host devices 108, 110 may be general-purpose computers running applications, and may interact with the data storage systems 102, 104 using a client/server model for exchange of information. For example, the host device 108 may request data from the data storage system 102, 104 (e.g., data on a storage device managed by a network storage control configured to process input/output (I/O) commands issued by the host device for the storage device), and the data storage system 102, 104 may return results of the request to the host device via the storage network connection 112, 114.

The nodes 116, 118 on clustered data storage systems 102, 104 may include network or host nodes that are interconnected as a cluster to provide data storage and management services, such as to an enterprise having remote locations, cloud storage, etc., for example. Such a node in the clustered network environment 100 may be a device attached to the network as a connection point, redistribution point, or communication endpoint, for example. A node may send, receive, and/or forward information over a network communications channel, and may include any device that meets any or all of these criteria. An example of a node may be a data storage and management server attached to a network, where the server may include a general purpose computer or a computing device particularly configured to operate as a server in a data storage and management system.

In an example, a first cluster of nodes such as the nodes 116, 118 (e.g., a first set of storage controllers configured to provide access to a first storage aggregate including a first logical grouping of one or more storage devices) may be located on a first storage site. A second cluster of nodes, not illustrated, may be located at a second storage site (e.g., a second set of storage controllers configured to provide access to a second storage aggregate including a second logical grouping of one or more storage devices). The first cluster of nodes and the second cluster of nodes may be configured according to a disaster recovery configuration where a surviving cluster of nodes provides switchover access to storage devices of a disaster cluster of nodes in the event a disaster occurs at a disaster storage site including the disaster cluster of nodes (e.g., the first cluster of nodes provides client devices with switchover data access to storage devices of the second storage aggregate in the event a disaster occurs at the second storage site).

As illustrated in the clustered network environment 100, nodes 116, 118 may include various functional components that coordinate to provide a distributed storage architecture for the cluster. For example, the nodes 116, 118 may include network modules 120, 122 and disk modules 124, 126. The network modules 120, 122 may be configured to allow the nodes 116, 118 (e.g., network storage controllers) to connect with host devices 108, 110 over the storage network connections 112, 114, for example, allowing the host devices 108, 110 to access data stored in the distributed storage system. Further, the network modules 120, 122 may provide connections with one or more other components through the cluster fabric 106. For example, in FIG. 1, the network module 120 of the node 116 may access a second data storage device (e.g., data storage device 130) by sending a request through the disk module 126 of the node 118.

The network module 120 and the disk module 124 may be referred to as being local to each other because each of these components resides in the same node 116 and/or communications between these components may be transmitted and received without transmitting the communications over a network (e.g., the fabric 106). Similarly, the network module 122 and the disk module 126 may be referred to as being local to each other because each of these components resides in the same node 118 and/or communications between these components may be transmitted and received without transmitting the communications over a network (e.g., the fabric 106).

Additionally, the network module 120 and the disk module 126 may be referred to as being remote from each other because these components reside in different nodes and/or communications between these components are transmitted and received by transmitting the communications over a network (e.g., the fabric 106). Similarly, the network module 122 and the disk module 124 may be referred to as being remote from each other because these components reside in different nodes and/or communications between these components are transmitted and received by transmitting the communications over a network (e.g., the fabric 106).

Disk modules 124, 126 may be configured to connect one or more data storage devices 128, 130, such as disks or arrays of disks, flash memory, or some other form of data storage, to the nodes 116, 118. The nodes 116, 118 may be interconnected by the cluster fabric 106, for example, allowing respective nodes in the cluster to access data on data storage devices 128, 130 connected to different nodes in the cluster. Disk modules 124, 126 may communicate with the data storage devices 128, 130 according to the SAN protocol, such as SCSI or FCP, for example. As seen from an operating system on nodes 116, 118, the data storage devices 128, 130 may appear as locally attached to the operating system. Accordingly, different nodes 116, 118, etc. may access data blocks through the operating system, rather than expressly requesting abstract files.

It should be appreciated that, while the clustered network environment 100 illustrates an equal number of network and disk modules, other embodiments may include a differing number of these modules. For example, there may be a plurality of network and disk modules interconnected in a cluster that does not have a one-to-one correspondence between the network and disk modules. That is, different nodes may have a different number of network and disk modules, and the same node may have a different number of network modules than disk modules.

Further, host devices 108, 110 may be networked with the nodes 116, 118 in the cluster, over the storage networking connections 112, 114. As an example, respective host devices 108, 110 that are networked to a cluster may request services (e.g., exchanging of information in the form of data packets) of nodes 116, 118 in the cluster, and the nodes 116, 118 may return results of the requested services to the host devices 108, 110. In an embodiment, the host devices 108, 110 may exchange information with the network modules 120, 122 residing in the nodes 116, 118 (e.g., network hosts) in the data storage systems 102, 104.

A data storage device may include one or more volumes. In an embodiment, the data storage devices 128, 130 include volumes 132, 134 which may include an implementation of storage of information onto disk drives or disk arrays or other storage (e.g., flash) as a file system for data, for example. In an example, a disk array may include all traditional hard drives, all flash drives, or a combination of traditional hard drives and flash drives. Volumes may span a portion of a disk, a collection of disks, or portions of disks, for example, and typically define an overall logical arrangement of file storage on disk space in the storage system.

Volumes are typically configured in formats that may be associated with particular storage systems, and respective volume formats typically include features that provide functionality to the volumes, such as providing an ability for volumes to form clusters. For example, a first storage system may utilize a first format for their volumes, and a second storage system may utilize a second format for their volumes, where the first and second formats are different from each other.

In the clustered network environment 100, the host devices 108, 110 may utilize the data storage systems 102, 104 to store and retrieve data from the volumes 132, 134. For example, the host device 108 may send data packets to the network module 120 in the node 116 within data storage system 102. The node 116 may forward the data to the data storage device 128 using the disk module 124, where the data storage device 128 includes the volume 132. In this example, the host device 108 may access the volume 132, to store and/or retrieve data, using the data storage system 102 connected by the storage network connection 112. Further, the host device 110 may exchange data with the network module 122 in the node 118 within the data storage system 104 (e.g., which may be remote from the data storage system 102). The node 118 may forward the data to the data storage device 130 using the disk module 126, thereby accessing volume 134 associated with the data storage device 130. While host device 108 is illustrated as communicating with data storage system 102, and similarly host device 110 with data storage system 104, the host devices 108, 110 may communicate via the network (e.g., via fabric 106) with other storage systems without requiring traversal through data storage systems 102, 104 respectively (as just one example). Thus, if data storage system 102 is down, then the host device 108 may still access data via storage system 104 or some other cluster at another site.

An object storage system may be part of the clustered network environment 100. An object manager 160 may maintain objects (e.g., store objects, read from objects, modifications of objects, and/or removal of objects) stored in the object storage system along with the objects' names. The object manager 160 may be coupled to the fabric 106 and may communicate with the data storage system 102 via the network module 120 and/or communicate with the data storage system 104 via the network module 122.

In some examples, aspects of the object manager 160 may be incorporated into the data storage systems 102, 104. For example, aspects of the object manager 160 may be incorporated into the nodes 116, 118 (e.g., in the network modules 120, 122 or the disk module 124, 126). The object manager 160 is shown as a box with dashed lines, indicating that the object manager 160 may be incorporated into the network module 120, the disk module 124, the network module 122, and/or the disk module 126. The object storage system may maintain objects (e.g., hundreds of billions of objects) and further maintain a flat object storage namespace that stores the objects' names in the object storage system. An object name may uniquely identify an individual object that is stored in the object storage system. A flat namespace may refer to a namespace that is not hierarchical. For example, subdirectory levels are not recognized or respected. In this example, the "/" character in an object name (if it appears at all) does not indicate anything about the structure of the namespace and is treated like any other character.

In an embodiment, a volume may include stored data as one or more files that reside in a hierarchical directory structure within the volume. In an embodiment, volumes may also, or alternatively, include stored data as a distributed database including a TOC database and one or more chapter databases. The one or more chapter databases may store a collection of object names included in a flat object storage namespace within the volumes. The volumes may span multiple nodes that are interconnected (e.g., via the fabric 106). The host devices 108, 110 may perform efficient searches that match all object names beginning with a specified string. Additionally, the object manager 160 may iterate the flat object storage namespace in alphabetically sorted order starting from any point in the namespace.

The TOC database 136 may be stored at the storage device 128. For example, the TOC database 136 may be stored at the volume 132 (or at the volume 134). The network module 120, 122 may receive from the disk module 124, 126 selected records from the TOC database 136, which the network module 120, 122 may then keep in memory as a cache to assist the network module 120, 122 efficiently process future requests. The dashed lines around the TOC database 136 may indicate that the network module 120 is caching some information from the TOC database 136. The chapter database 138 is stored in a volume 132 and is coupled to the disk module 124. Additionally, a chapter database may be replicated for redundancy. The TOC database and chapter databases are discussed further below in relation to, for example, aspects of FIGS. 2-9.

Figure 2:
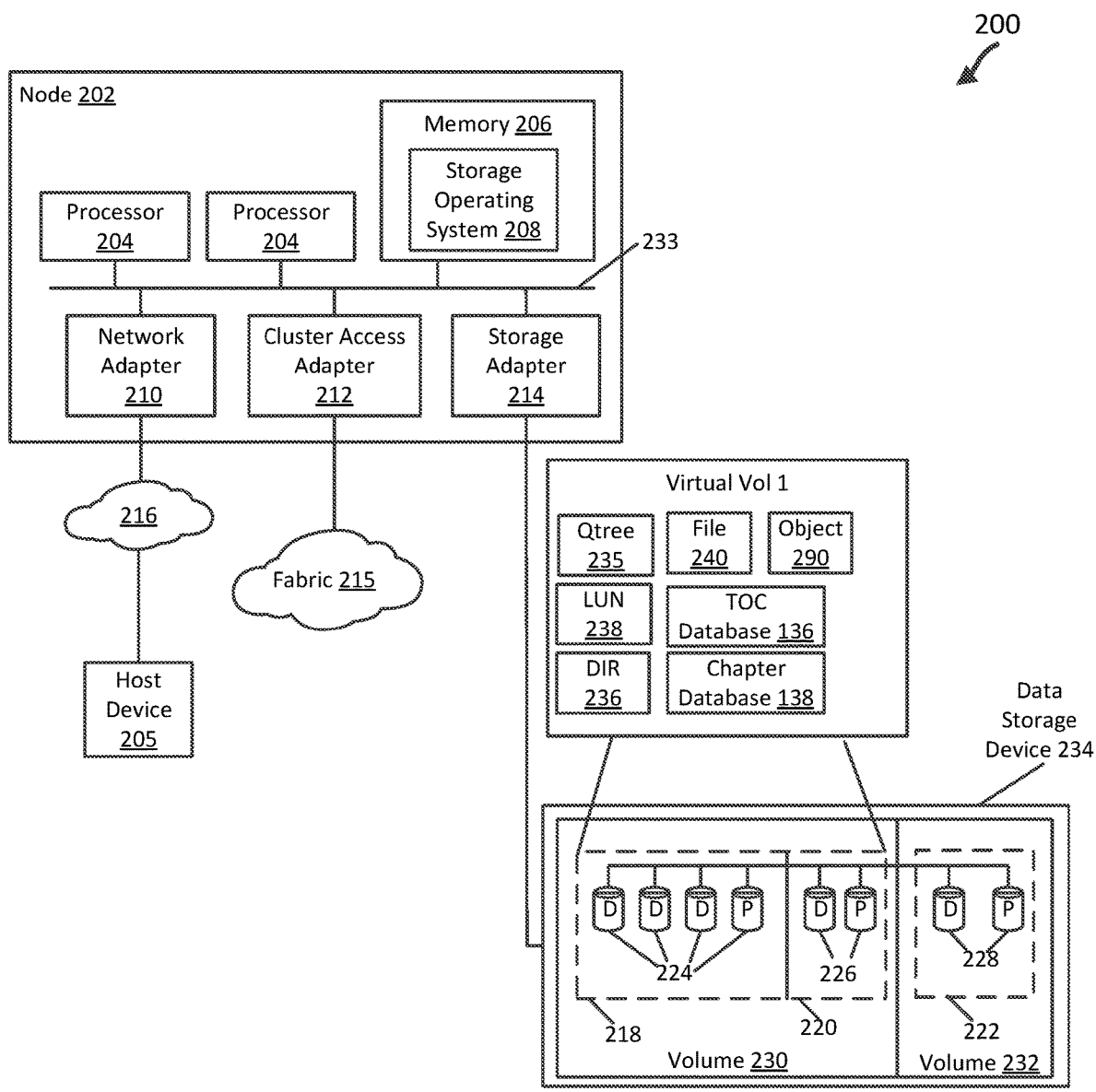
FIG. 2 is an illustrative example of a data storage system in accordance with one or more aspects of the present disclosure.

FIG. 2 is an illustrative example of a data storage system 200 (e.g., data storage system 102, 104 in FIG. 1), in accordance with one or more aspects of the present disclosure. The data storage system 200 includes a node 202 (e.g., nodes 116, 118 in FIG. 1), and a data storage device 234 (e.g., data storage devices 128, 130 in FIG. 1). The node 202 may be a general purpose computer, for example, or some other computing device particularly configured to operate as a storage server. A host device 205 (e.g., host device 108, 110 in FIG. 1) may be connected to the node 202 over a network 216, for example, to provide access to files and/or other data stored on the data storage device 234. The node 202 may include a storage controller that provides client devices, such as the host device 205, with access to data stored within data storage device 234.

The data storage device 234 can include mass storage devices, such as disks 224, 226, 228 of a disk array 218, 220, 222. It will be appreciated that the techniques and systems, described herein, are not limited by the example illustrated in FIG. 2. For example, disks 224, 226, 228 may include any type of mass storage devices, including but not limited to magnetic disk drives, flash memory (e.g., SSDs), and any other similar media adapted to store information, including, for example, data (D) and/or parity (P) information.

The node 202 includes one or more processors 204, a memory 206, a network adapter 210, a cluster access adapter 212, and a storage adapter 214 interconnected by a system bus 242. The network adapter 210 may correspond to and/or be an example of the network module 120 in FIG. 1. The storage adapter 214 may correspond to and/or be an example of the disk module 124 in FIG. 1. The data storage system 200 also includes an operating system 208 installed in the memory 206 of the node 202 that can, for example, implement a Redundant Array of Independent (or Inexpensive) Disks (RAID) optimization technique, or error correction coding (to name just a few examples), to optimize a reconstruction process of data of a failed disk in an array. The operating system 208 may manage communications for the data storage system 200, and communications between other data storage systems that may be in a clustered network, such as attached to a cluster fabric 215 (e.g., cluster fabric 106 in FIG. 1). Thus, the node 202, such as a network storage controller, can respond to host device requests to manage data on the data storage device 234 (e.g., or additional clustered devices) in accordance with these host device requests.

The operating system 208 may include several modules or "layers" executed by one or both of the network adapter 210 or the storage adapter 214. These layers may include a file system 240 that keeps track of objects and object namespaces stored in the storage devices and manages read/write operations (e.g., executes read/write operations on storage in response to client requests). The operating system 208 may establish one or more file systems on the data storage system 200, where a file system can include software code and data structures that implement a persistent namespace of files and directories, for example. The file system may logically organize stored information as a non-hierarchical structure for files/directories/objects at the storage devices. Each "on disk" file may be implemented as a set of blocks configured to store information, such as text. These data blocks may be organized within a volume block number (VBN) space that is maintained by one or more databases accessible by the storage operating system 208. The file system may also assign each data block in the file a corresponding "file offset" or a file block number (FBN). The file system may assign sequences of FBNs on a per-file basis, whereas VBNs may be assigned over a larger volume address space. The file system may organize the data blocks within the VBN space as a logical volume. The file system may be composed of a contiguous range of VBNs from zero to n, for a file system of size n–1 blocks, where n is a number greater than 1. In an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 may include storage locations that are addressable by the processors 204 and network adapter 210, cluster access adapter 212, and/or storage adapter 214 for storing related software application code and data structures. The processors 204, the network adapter 210, the cluster access adapter 212, and/or the storage adapter 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent that other processing and memory mechanisms, including various computer readable media, may be used for storing and/or executing application instructions pertaining to the techniques described herein. For example, the operating system may also utilize one or more control files (not shown) to aid in the provisioning of virtual machines.

The network adapter 210 includes the mechanical, electrical and signaling circuitry for connecting the data storage system 200 to the host device 205 over the network 216, which may include, among other things, a point-to-point connection or a shared medium, such as a LAN. The host device 205 may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information may be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information may be retrieved by the storage adapter 214 and, in some examples, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network 216 (and/or returned to another node attached to the cluster over the cluster fabric 215).

In an embodiment, storage of information on disk arrays 218, 220, 222 can be implemented as one or more storage volumes 230, 232 that include a cluster of disks 224, 226, 228 defining an overall logical arrangement of disk space. The disks 224, 226, 228 that include one or more volumes may be organized as one or more groups of RAIDs (while in other examples, error correction coding may be used). As an example, volume 230 includes an aggregate of disk arrays 218 and 220, which include the cluster of disks 224 and 226. In an example, to facilitate access to disks 224, 226, 228, the operating system 208 may implement a file system (e.g., write anywhere file system) that logically organizes the information as a non-hierarchical structure of files on the disks. Accordingly, respective files may be implemented as a set of disk blocks configured to store information, whereas databases may be implemented to store information about the files and where they are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example. A physical volume corresponds to at least a portion of physical storage devices whose address, addressable space, location, etc. does not change, such as at least some of one or more data storage devices 234 (e.g., a Redundant Array of Independent (or Inexpensive) Disks (RAID system)). In some examples, the location of the physical volume does not change in that the (range of) address(es) used to access it may generally remain constant. A virtual volume, in contrast, may be stored over an aggregate of disparate portions of different physical storage devices. The virtual volume may be a collection of different available portions of different physical storage device locations, such as some available space from each of the disks 224, 226, and/or 228, and is not "tied" to any one particular storage device. Accordingly, a virtual volume may be said to include a layer of abstraction or virtualization, which allows it to be resized and/or flexible in some regards.

Further, a virtual volume may include one or more logical unit numbers (LUNs) 238 and/or directories 236. The LUNs 238 may be characterized as constituting a virtual disk or drive upon which data within the virtual volume may be stored within the aggregate. LUNs may be referred to as virtual drives, such that they emulate a hard drive from a general purpose computer, while they actually include data blocks stored in various parts of a volume.

One or more data storage devices 234 may have one or more physical ports, where each physical port may be assigned a target address (e.g., SCSI target address). To represent respective volumes stored on a data storage device, a target address on the data storage device 234 may be used to identify one or more LUNs 238. For example, when the node 202 connects to a volume 230, 232 through the storage adapter 214, a connection between the node 202 and the one or more LUNs 238 underlying the volume is created. Additionally or alternatively, respective target addresses may identify multiple LUNs, such that a target address may represent multiple volumes. The I/O interface, which may be implemented as circuitry and/or software in the storage adapter 214 or as executable code residing in memory 206 and executed by the processors 204, for example, may connect to volume 230 by using one or more addresses that identify the one or more LUNs 238.

An object storage system may include the data storage system 200, which may be part of the clustered network environment 100. A volume may have a plurality of inodes, where each inode may be associated with a plurality of storage blocks. If an object is created and stored in the object storage system, the node 202 may store the object across one or more blocks. An inode may reference or point to the actual object data by referencing or pointing to the one or more blocks storing the object. An inode may be uniquely identified in the clustered network environment 100 by its file handle, which may be composed of a volume identifier that identifies a volume and an inode number within the volume. The file handle may include a generation number field that indicates how many times this particular inode has been consumed. An inode may be consumed and then freed, and then consumed again for a new purpose. Each time an inode is reused, the generation number may be increased. Accordingly, if a host device attempts to access an object using a stale generation number, then the access request may fail.

The object storage system may include a database of a first type and one or more databases of a second type. The database of the first type may be a TOC database, and a database of the second type may be a chapter database. As shown in FIG. 2, the virtual volume may store the TOC database 136, the chapter database 138, and/or one or more objects 290. The TOC database may provide an overview of the number of chapter databases in a collection of chapter databases and the location of these chapter databases. For example, the TOC database may store one or more entries or records, each record including a name marker and a chapter database file handle. The name marker may indicate a range of object names covered by a given chapter database, and the chapter database file handle may reference a location at which the chapter database is stored. Additionally, the chapter databases may store one or more entries or records, each record including an object name and an object file handle. The object name may identify an object, and the object file handle may reference a location at which the object is stored.

A chapter database may cover a discrete and continuous range of object names. A chapter database that covers a range of object names may also be referred to as a chapter database that owns, is responsible for, or includes the range of object names. In an example, if an object name is within the flat object storage namespace, exactly one chapter owns the object name. In other words, there may be a one-to-one relationship between an object name and a chapter database. If the chapter database includes an object name, then the chapter database may store a reference to a location at which the object identified by the object name is stored. In some examples, the flat object storage namespace includes an object name and the data corresponding to the object name is not accessible via the disk module. For example, the data may be archived off-site or is using a shared single-instance-storage with other content elsewhere.

A chapter database that covers an object name may not necessarily include the object name. For example, the chapter database may cover the range of object names "A-G," but not include an object name that falls within this range and is requested by a host device. In this example, the object having the object name has not yet been created and saved in the object storage system or is identified by a different object name. The collection of chapter databases serves the overall workload for maintaining (e.g., creating, reading from, writing to, destroying, and the like) objects and their object names. For example, the collection of chapter databases may include an ordered enumeration of all object names within the flat object storage namespace. If the collection of chapter databases were to be concatenated and laid out semantically from beginning to end, the collection of chapter databases would represent the entire object namespace.

The decision of where to store a chapter database may have long-term ramifications on the object storage system. For example, if the object manager 160 stores a chapter database at a particular volume, that particular volume may receive more traffic compared to before the chapter database was stored at the particular volume.

The object manager 160 may perform operations that include looking up an object name in the namespace and then reading data from the corresponding object. Such operations may be accomplished quicker if the chapter database covering the range of object names including the object's name and the object were stored at the same volume. For example, a chapter database may reside at a first volume, and the object manager 160 may determine that, upon looking up the desired object name, the object is stored at a second volume different from the first volume. In this example, performing the operation may result in an additional latency compared to if the chapter database and the object were to reside at the same volume. The completion time for performing an operation that involves referencing multiple volumes as part of a single task may be longer than for performing same-volume operations.

The object manager 160 may estimate the probability of a particular object being on the same volume as its corresponding chapter database. As a chapter database splits into two and/or merges with another chapter database, the collective namespace responsibility may flow from one volume to another volume. For example, a disk module may receive a rush of new "Aardvark-" related objects to store in an initial chapter database responsible for all "A-" object names. After the disk module performs some number of new object-create actions (and allocating inodes from the chapter database's own local volume for each one), the object manager 160 may determine to split the chapter database into two partitioned chapter databases. The object manager 160 may store a first one of the two partitioned chapter databases at the chapter database's local volume and may store a second one of the two partitioned chapter databases at a volume different from the chapter database's local volume. Accordingly, about half of the names in the Aardvark-filled chapter database may be stored in the second partitioned database that differs from where its objects were allocated, while the object names in the first new partitioned database may still be co-located on this volume. In this example, about half of the objects identified by the object names are "local" to the chapter database and about half of the objects identified by the object names are "remote" from the chapter database.

Additionally, each of the two new partitioned chapter databases may be only half-full of object names and ready to accept new Aardvark-related names from the host device 205 (or any other host device). If the pattern continues and the host device 205 (or any other host device) writes more Aardvark-related names, then each of the two new partitioned chapter database may accept a flood of new names in the namespace. In some examples, the object manager 160 may allocate new inodes that are local to a particular chapter database. If both partitioned chapter databases receive new object names in this namespace evenly and they each grow to a point where the object manager 160 determines that they should be split again, the first chapter database (the chapter database that is local to the original objects) may have one hundred percent local object names, and the second chapter database (the chapter database that is remote from the original objects) may have approximately fifty percent local object names. The collective result may be that seventy-five percent (an average of the one hundred percent local object names and the fifty percent local object names) of the objects in this storage container may, at this moment, be stored on the same volume as their corresponding portion of the namespace. This pattern may continue and provide approximately a two-thirds locality for objects.

Figure 3:
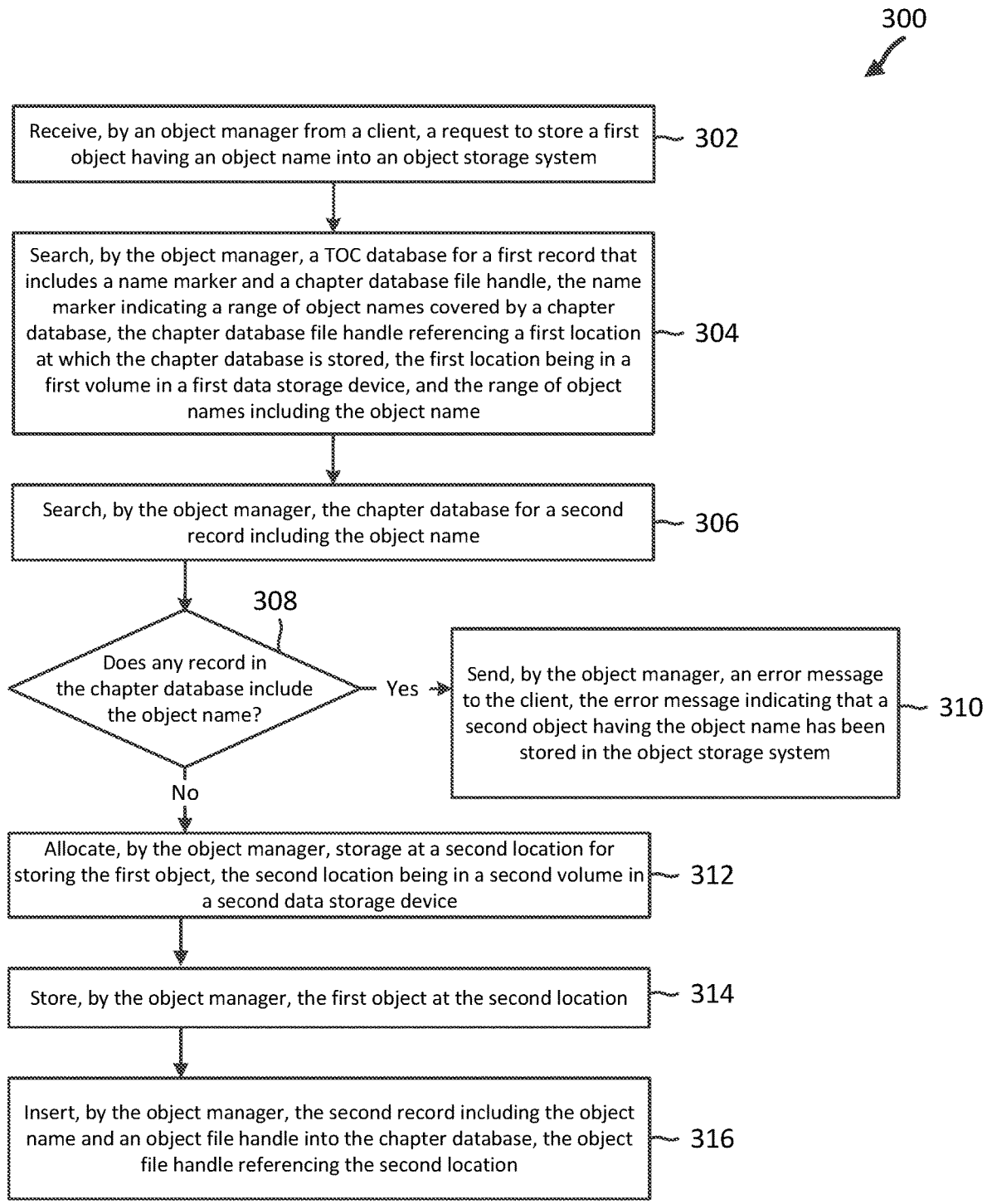
FIG. 3 is a flow diagram of a method of storing an object in an object storage system in accordance with one or more aspects of the present disclosure.

FIG. 3 is a flow diagram of a method 300 of storing an object in an object storage system in accordance with one or more aspects of the present disclosure. Blocks of the method 300 can be executed by a computing device (e.g., a processor, processing circuit, the storage operating system 208, the network adapter 210, the cluster access adapter 212, the storage adapter 214, and/or other suitable component, such as of the node 202 in FIG. 2). For example, the data storage system (e.g., data storage system 102, 104 in FIG. 1 or the data storage system 200 in FIG. 2) may utilize one or more components, such as the nodes 116, 118 in FIG. 1, the network modules 120, 122 in FIG. 1, the disk modules 124, 126 in FIG. 1, the data storage devices 128, 130 in FIG. 1, to execute the blocks of the method 300. As illustrated, the method 300 includes a number of enumerated blocks, but embodiments of the method 300 may include additional blocks before, after, and in between the enumerated blocks. In some embodiments, one or more of the enumerated blocks may be omitted or performed in a different order.

Figure 4:
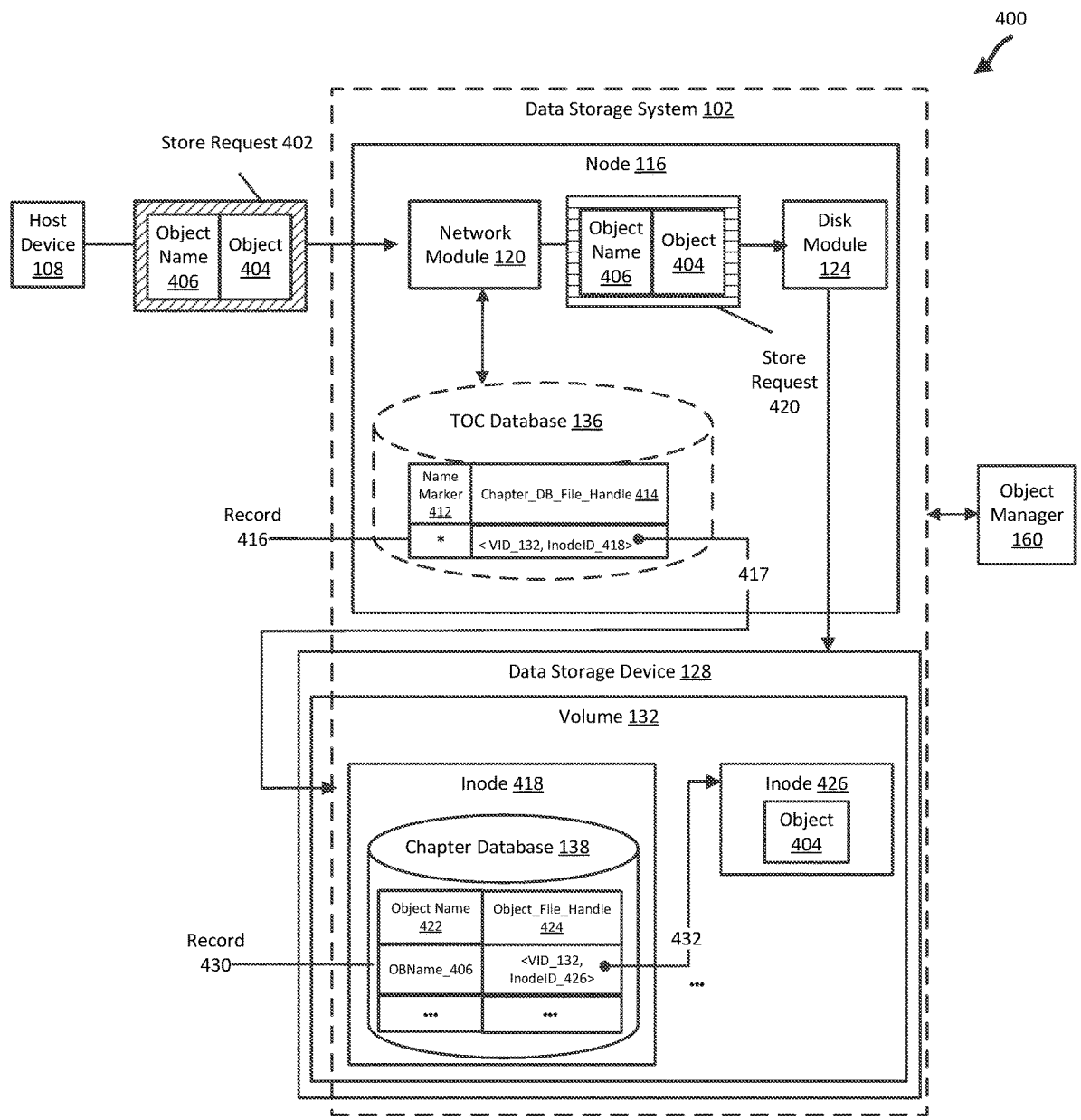
FIG. 4 is a block diagram illustrating an object storage system that processes a request to store an object in accordance with one or more aspects of the present disclosure.

FIG. 4 will be discussed relative to FIG. 3 (and vice versa) to better understand concepts related to storing an object in an object storage system. FIG. 4 is a block diagram illustrating an object storage system 400 that processes a request to store an object in the object storage system in accordance with one or more aspects of the present disclosure. The object storage system 400 includes the data storage device 102, the node 116, the network module 120, the disk module 124, the TOC database 136, the object manager 160, the data storage device 128, the volume 132, and the chapter database 138, as discussed in relation to FIG. 1.

Additionally, it should be understood that aspects of the object manager 160 may be incorporated in the data storage system 102 (e.g., in the network module 120 and/or the disk module 124). In the present disclosure, reference to an object manager 160 performing an action (e.g., receiving, transmitting, determining, storing, etc.) may refer to the data storage system (e.g., or one or more components within the data storage system 102 such as the node 116, the network module 120, disk module 124, data storage device 128, and the like) performing such action.

Referring to FIG. 3, at block 302, the method 300 includes receiving, by an object manager 160 from a client, a request to store a first object having an object name into an object storage system. As illustrated in FIG. 4, the host device 108 may transmit a store request 402 to the data storage system 102. The store request 402 may be a request to store an object 404 having an object name 406 into the object storage system 400, which may be part of the clustered network environment 100. The network module 120 may receive the store request 402 from the host device 108.

Referring back to FIG. 3, at block 304, the method 300 includes searching, by the object manager 160, a TOC database for a first record that includes a name marker and a chapter database file handle, the name marker indicating a range of object names covered by a chapter database, the chapter database file handle referencing a first location at which the chapter database is stored, the first location being in a first volume in a first data storage device, and the range of object names including the object name.

In FIG. 4, the network module 120 may cache, in memory, some records from the TOC database 136 that the network module 122 received in response to its communications with the disk module 124. The cached records may assist the networking module to handle requests associated with objects (e.g., read, store, and/or write requests) efficiently, as discussed in the present disclosure. In some examples, each query, iteration, insert, or delete operation may be resolved against the TOC database 136 to identify which chapter database is responsible for the operation. As will be discussed in more detail, the TOC database 136 may be slow changing. For example, as the namespace grows, fewer split and merge operations on the chapter databases may occur, potentially resulting in fewer changes (e.g., additions or removal of records) to the TOC database 136. These properties (e.g., a high rate of read and a low or decreasing rate of change) make the TOC database an excellent candidate for caching.

By caching the contents of the TOC database 136 and invalidating that cache under particular conditions (e.g., when the TOC database 136 changes), a typical operation may bypass actually loading the TOC database 136 itself and instead may use the cache to identify the correct chapter database quickly. Moreover, it may be unnecessary to cache the entire TOC database 136 all the time. For example, a dynamic cache may store routing hints (e.g., records indicating that a particular range of object names (e.g., names between A- and D-)) should be routed to a particular chapter database. By sorting these hints when available, the object manager 160 may determine which chapter database is appropriate for looking up (or creating, enumerating from, deleting, and the like) a given object name. If no matching hints are available, the host device may consult the actual TOC database 136 and thereby build a new hint to put into its table of routing hints.

The network module 120 has direct access to a database if the network module 120 may access the database without an intermediary. The TOC database 136 may reference one or more chapter databases, which collectively represents a flat object storage namespace storing a complete collection of object names that identify objects belonging to a client in the object storage system. The network module 120 may cache one or more records stored in the TOC database 136. The TOC database 136 may include one or more records, each record including a name marker that indicates a range of object names covered by a given chapter database and further including a chapter database file handle that references a location at which the given chapter database is stored. For example, the TOC database 136 includes a first column "Name Marker" 412 indicating a range of object names and further includes a second column "Chapter_DB_File_Handle" 414 storing two parameters. Each record in the TOC database 136 may indicate a mutually exclusive range of object names compared to each other. A first parameter "VID" represents a volume identifier that identifies a particular volume that stores a given chapter database, and a second parameter "InodeID" represents an inode identifier that identifies a particular inode within the particular volume. The chapter database is stored at the particular inode, which is stored within the particular volume.

A number of records in the TOC database 136 may indicate the number of chapter databases in the collection of chapter databases. The TOC database 136 includes a single entry or record 416 including a name marker "*" (stored in the first column "Name Marker" 412) and a chapter database file handle <VID_132, InodeID_418> (stored in the second column "Chapter_DB_File_Handle" 414). The name marker "*" represents a wild card (e.g., the range of object names includes all alphanumeric symbols) and accordingly indicates that a single chapter database stores the complete flat namespace of the collection of object names. The chapter database file handle <VID_132, InodeID_418> corresponds to the name marker "*" and references the chapter database 138, which is stored at an inode 418 (identified by the InodeID_418) within a volume 132 (identified by the VID_132). A name marker corresponds to a chapter database file handle if they are both stored in the same record. The TOC database 136 references the chapter database 138, which is stored at a location referenced by the chapter database file handle <VID_132, InodeID_418>. In other words, the chapter database file handle <VID_132, InodeID_418> references an inode 418 identified by the InodeID_418 within the volume 132 identified by the VID_132. The data stored in the column "Chapter_DB_File_Handle" 414 may be a memory address of the inode 418 and/or a pointer to the inode 418 within the volume 132. For example, a reference 417 is shown from the chapter database file handle <VID_132, InodeID_418> to the inode 418 within the volume 132 in the data storage device 128.

The network module 120 may be unable to directly access the data storage device 128. The network module 120 does not have direct access to a data storage device if the network module 120 is unable to access the data storage device without an intermediary. For example, the network module 120 may be unable to access the chapter database 138 without using disk module 124 as an intermediary.

The network module 120 may determine, based on the chapter database file handle specified in the record 416, that the chapter database 138 is stored in the data storage device 128. Additionally, the network module 120 may determine that the disk module 124 accesses data within the data storage device 128. For example, the disk module 124 owns the volumes (e.g., volume 132) residing in the data storage device 128. To access the data storage device 128, the network module 120 may transmit a request to the data storage device 128 via the disk module 124.

In some examples, the disk module 124 and/or the data storage device 128 communicate in a protocol different from the host device 108. In an example, the host device 108 may communicate with the data storage system 102 via a first protocol, such as an object protocol (e.g., AMAZON S3®), and the disk module 124 and/or the data storage device 128 may communicate with components using a second protocol different from the first protocol. For example, the network module 120 may receive the store request 402 in the first protocol, which is indicated by a first pattern shown corresponding to the store request 402 and translate the store request 402 into an internal messaging format that is understandable by the disk module 124 and/or the data storage device 128. The network module 120 may translate the store request 402 into a store request 420 that is in the second protocol (e.g., an internal messaging format), as indicated by the second pattern corresponding to the store request 420. The disk module 124 may receive the store request 420 and access the data storage device 128 in accordance with the store request 420. In other examples, the first and second protocols are the same, and network module 120 transmits the store request 402 to the disk module 124 without translation of the request into another protocol.

Referring back to FIG. 3, at block 306, the method 300 includes searching, by the object manager 106, the chapter database for a second record including the object name. Each chapter database may cover a discrete and continuous range of object names in the flat namespace.

In FIG. 4, the chapter database 138 may include one or more entries or records, each record including an object name and further including an object file handle that references a location at which the object identified by the object name is stored. For example, the chapter database 138 includes a first column "Object Name" 422 storing one or more object names and further includes a second column "Object_File_Handle" 424 storing two parameters. A first parameter "VID" represents a volume identifier that identifies a particular volume that stores an object identified by the corresponding object name, and a second parameter "InodeID" represents an inode identifier that identifies a particular inode within the particular volume. The object is stored at the particular inode, which is stored within the particular volume.

Referring back to FIG. 3, at block 308, the method 300 includes determining whether any record in the chapter database 138 includes the object name. If a record in the chapter database 138 includes the object name, then the object name has already been taken and would not uniquely identify the object. In this instance, the method 300 may proceed to block 310. At block 310, the method 300 includes sending, by the object manager 160, an error message to the client, the error message indicating that another object having the object name has already been stored in the object storage system. The object manager 160 may provide the error message along with a request to the client for a different name for the object.

In contrast, if no record in the chapter database includes the object name, then the object name is unique within the flat namespace and accordingly may be stored in the object storage system to identify the object. If the object name is within the flat namespace, the on name would be stored in the chapter database covering the range of object names including the object name. In this instance, the method 300 may proceed to block 312. At block 312, the method 300 includes allocating, by the object manager 160, storage at a second location for storing the first object, the second location being in a second volume in a second data storage device.

At block 314, the method 300 includes storing, by the object manager 160, the first object at the second location. The first location at which the chapter database is stored may include a first volume and a first inode. In an example, the second location at which the object is stored may include the first volume and a second inode different from the first inode, as shown in FIG. 4. In FIG. 4, the disk module 124 receives the store request 420 from the network module 120 and proceeds to execute actions to store the object 404 into the object storage system 400. To reduce latency, it may be desirable for the object manager 160 to store the object 404 at the same volume 132 where the chapter database 138 is stored. For example, the disk module 124 may determine to store the object 404 as an inode 426 within the volume 132. The disk module 124, for example, may store the object 404 across one or more blocks in the inode 426. In another example, the second location at which the object is stored may include a second volume different from the first volume. In this example, the chapter database and the object are stored at different volumes.

Referring back to FIG. 3, at block 316, the method 300 includes inserting, by the object manager 160, the second record including the object name and an object file handle into the chapter database, the object file handle referencing the second location.

In FIG. 4, the disk module 124 may insert a record 430 into the chapter database 138 in accordance with the store request 420 and storage of the object 404 at the second location. The chapter database 138 includes a record 430 including an object name "OBName_406" (corresponding to object name 406 and stored in the first column "Object Name" 422) that identifies the object 404 and further includes an object file handle <VID_132, InodeID_426> (stored in the second column "Object_File_Handle" 424) that references the corresponding object 404. An object file handle corresponds to an object if the object file handle and the object name that identifies the object are both stored in the same record. In other words, the chapter database 138 references the object 404, which is stored at a location referenced by the corresponding object file handle <VID_132, InodeID_426>. The object file handle <VID_132, InodeID_426> references an inode 426 identified by the InodeID_426 within the volume 132 identified by the VID_132. The data stored in the column "Object_File_Handle" 424 may be a memory address of the inode 426 and/or a pointer to the inode 426 within the volume 132. For example, a reference 432 is shown from the object file handle <VID_132, InodeID_426> to the inode 426 within the volume 132.

After the object 404 is stored in the object storage system 400, the number of records in the chapter database 138 may increase by one. By routing a request (e.g., the store request 402) directly to a particular disk module (e.g., disk module 124), the disk module may consult the chapter database to execute actions in accordance with the request without involving other disk modules or data storage devices in the clustered network environment 100. Such routing may be performed for numerous disk modules and data storage devices, with each one processing a small workload. Such distribution of workload may help balance servicing these types of requests across the clustered network environment 100.

In the example illustrated in FIG. 4, the TOC database 136 and the chapter database 138 are stored in the same data storage system 102. Accordingly, the network module 120 transmits the store request (e.g., store request 402 or store request 420) to a local disk module (e.g., disk module 124) for storage of the object 404. A network module is local to a disk module if they reside in the same node. Additionally, a network module is local to a data storage device if they reside in the same data storage system. The data storage system 102 (e.g., the network module 120 and the disk module 124) may service the host device 108's request faster compared to if the network module 120 were to transmit the store request to a disk module across a network (e.g., fabric 106) for storage of the object. In other examples, the network module 120 may transmit the store request (e.g., store request 402 or store request 420) to a disk module residing in a data storage system different from the data storage system 102. For example, the network module 120 may transmit the store request to the disk module 126 residing in the data storage system 104 (e.g., as illustrated in FIG. 1).

Figure 5:
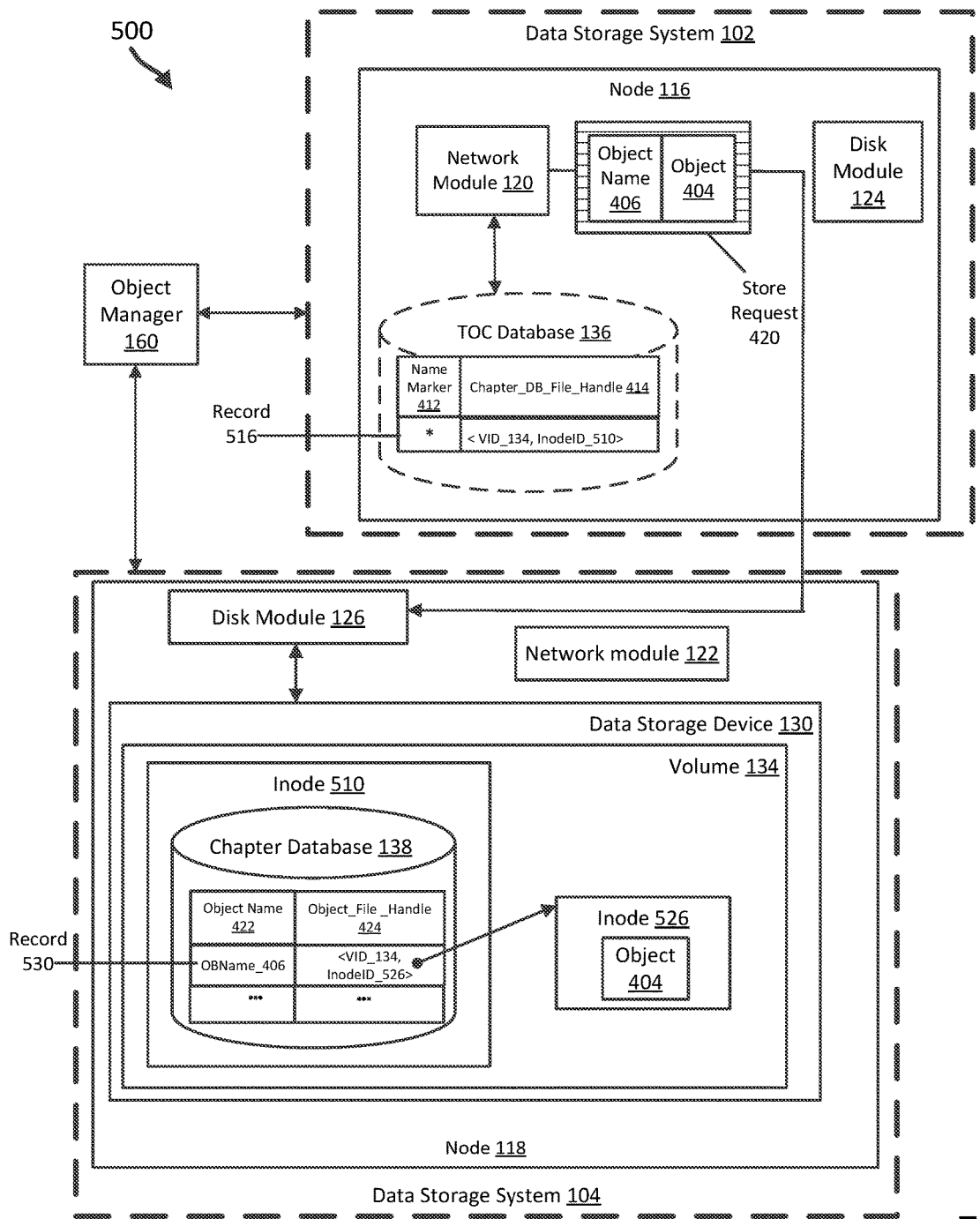
FIG. 5 is another block diagram illustrating an object storage system that processes a request to store an object in accordance with one or more aspects of the present disclosure.

FIG. 5 is a block diagram illustrating an object storage system 500 that processes a request to store an object in the object storage system 500 in accordance with one or more aspects of the present disclosure. The object storage system 500 may be part of the clustered network environment 100 in FIG. 1. The object storage system 500 includes the data storage system 102, the node 116, the network module 120, the disk module 124, the TOC database 136, the object manager 160, the volume 132, the data storage system 104, the node 118, the network module 122, the disk module 126, the chapter database 138, and the volume 134, as discussed in relation to FIG. 1.

Additionally, it should be understood that aspects of the object manager 160 may be incorporated in the data storage system 102 (e.g., in the network module 120 and/or the disk module 124) and/or in the data storage system 104 (e.g., in the network module 122 and/or the disk module 126). In the present disclosure, reference to an object manager 160 performing an action (e.g., receiving, transmitting, determining, storing, etc.) may refer to the data storage system (e.g., or one or more components within the data storage system 102 such as the node 116, the network module 120, disk module 124, data storage device 128, one or more components within the data storage system 104 such as the node 118, the network module 122, disk module 126, data storage device 130, and/or the like) performing such action.

In FIG. 5, the network module 120 may cache, in memory, some records from the TOC database 136 that the network module 122 received in response to its communications with the disk module 124. The cached records may assist the networking module to handle requests associated with objects (e.g., read, store, and/or write requests) efficiently, as discussed in the present disclosure. In FIG. 5, the TOC database 136 includes a record 516 including the name marker "*" (stored in the first column "Name Marker" 412) and a chapter database file handle <VID_134, InodeID_510> (stored in the second column "Chapter_DB_File_Handle" 414). Accordingly, the TOC database 136 references the chapter database 138, which in the example is stored at an inode 510 (identified by the InodeID_510) within a volume 134 (identified by the VID_134) in the data storage device 130.

The network module 120 may determine that the chapter database 138 is stored in the data storage device 130, which resides in the data storage system 104. The network module 120 may determine that the disk module 126 has direct access to the data storage device 130 and may accordingly transmit the store request 420 to the disk module 126 (rather than to the disk module 124 as shown in FIG. 4). In this example, the disk module 126 may receive the store request 420 and allocate storage at the inode 526 within the volume 134 for storing the object 404. After the object 404 is stored at the inode 526, the object manager 160 may insert a record 530 into the chapter database. The record 530 includes the object name 406 ("OBName_406") of the object 404 and an object file handle <VID_134, InodeID_526> that references the object 404.

The volume 134 may have been selected to store the chapter database 138 because, for example, at the time the chapter database 138 was created, the volume 134 had a low utilization rate or high storage capacity. By storing chapter databases at such volumes, the workload may be distributed across the clustered network environment 100.

As objects are created and/or destroyed in the object storage system, the chapter databases may be updated accordingly. As more objects are stored into a chapter database, the chapter database may continue to grow in size. For example, if an object is created, then a record corresponding to the create operation may be inserted into the chapter database. Conversely, as more objects are removed from a chapter database, the chapter database may shrink in size. For example, if an object is deleted from the object storage system, then a record corresponding to the delete operation may be removed from the chapter database. The number of records in a chapter database may grow or shrink based on the number of objects created and/or deleted.

Additionally, as chapter databases grow and/or shrink, the flat namespace may adapt to the ongoing workload experienced in the clustered network environment 100. The range of object names may be provided in a sorted and continuous order. In some examples, the semantic range of any particular chapter database may change over time. For example, a chapter database may cover a first range of object names, but as objects referenced by the chapter database are added and/or removed, the chapter database may cover a second range of object names different from the first range. In some examples, the semantic range of a given chapter database may be fixed and immutable. After a period of time, if the given chapter database has become too large, the object manger 160 may split the given chapter database into two or more partitioned chapter databases, remove a TOC entry referencing the given chapter database from the TOC, and replace the TOC entry with new TOC entries for each of these new partitioned chapter databases. The object manager 160 may assign each partitioned chapter database to cover a specific sub-portion of the original or given chapter database's range, and after creation each of these partitioned chapter database's assigned range of object names may be likewise immutable until the object manager 160 splits the partitioned chapter database.

Similarly, if the object manager 160 merges two or more sibling chapter databases to form a new combined chapter database, then the new combined chapter database may cover all of those siblings' range of object names. Additionally, the object manager 160 may replace the TOC entries referencing any of the sibling chapter databases with a combined TOC entry that references the new combined chapter database. The namespace range that is covered by the new combined chapter database may be immutable for its own lifetime.

Rather than allow chapter databases to grow unhindered, it may be desirable to split large chapter databases when they have attained a certain number of records. In an example, if a number of records stored in an original chapter database satisfies a split threshold (e.g., is greater than the split threshold), then the original chapter database may be split into two partitioned chapter databases. Each of the two partitioned chapter databases may store a subset of the records in the original chapter database, with the two partitioned chapter databases storing, in total, the complete number of records initially stored in the original chapter database. Accordingly, each of the partitioned chapter databases stores fewer records (e.g., is smaller) than the original chapter database. Although an original chapter database has been described as being split into two partitioned chapter databases, it should be understood that the original chapter database may be split into two or more partitioned chapter databases (e.g., three, four, five, or more). Details on splitting a chapter database are provided in, for example, aspects of FIGS. 6 and 7.

In another example, if a number of records stored in a first chapter database and a number of records stored in a second chapter database satisfies a merge threshold, then the first chapter database may be merged with the second chapter database (or the second chapter database with the first chapter database) to create a combined chapter database. For example, a number of records stored in a chapter database may satisfy the merge threshold if the number is less than the merge threshold. The merger of the first and second chapter databases may create the combined chapter database, which stores a complete set of records initially stored in the first and second chapter databases. Accordingly, the combined chapter database stores more records (e.g., is larger) than either of the first and second chapter databases alone. Details on merging two chapter databases are provided in, for example, aspects of FIG. 8.

Figure 6:
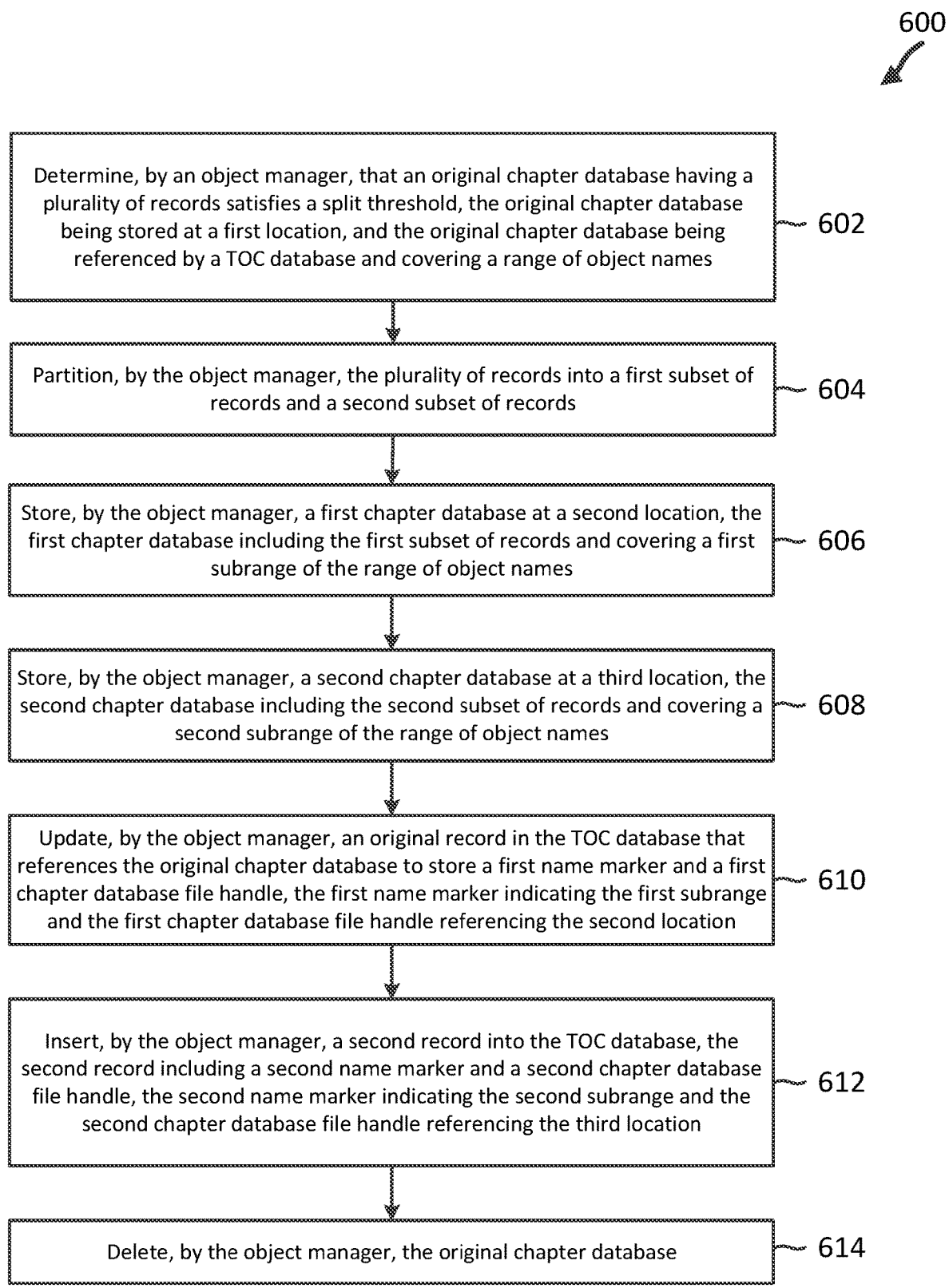
FIG. 6 is a flow diagram of a method of splitting a chapter database into two partitioned chapter databases in accordance with one or more aspects of the present disclosure.

FIG. 6 is a flow diagram of a method 600 of splitting a chapter database into two partitioned chapter databases in accordance with one or more aspects of the present disclosure. Blocks of the method 600 can be executed by a computing device (e.g., a processor, processing circuit, the storage operating system 208, the network adapter 210, the cluster access adapter 212, the storage adapter 214, and/or other suitable component, such as of the node 202 in FIG. 2). For example, the data storage system (e.g., data storage system 102, 104 in FIG. 1 or the data storage system 200 in FIG. 2) may utilize one or more components, such as the nodes 116, 118 in FIG. 1, the network modules 120, 122 in FIG. 1, the disk modules 124, 126 in FIG. 1, the data storage devices 128, 130 in FIG. 1, to execute the blocks of the method 600. As illustrated, the method 600 includes a number of enumerated blocks, but embodiments of the method 600 may include additional blocks before, after, and in between the enumerated blocks. In some embodiments, one or more of the enumerated blocks may be omitted or performed in a different order.

Figure 7:
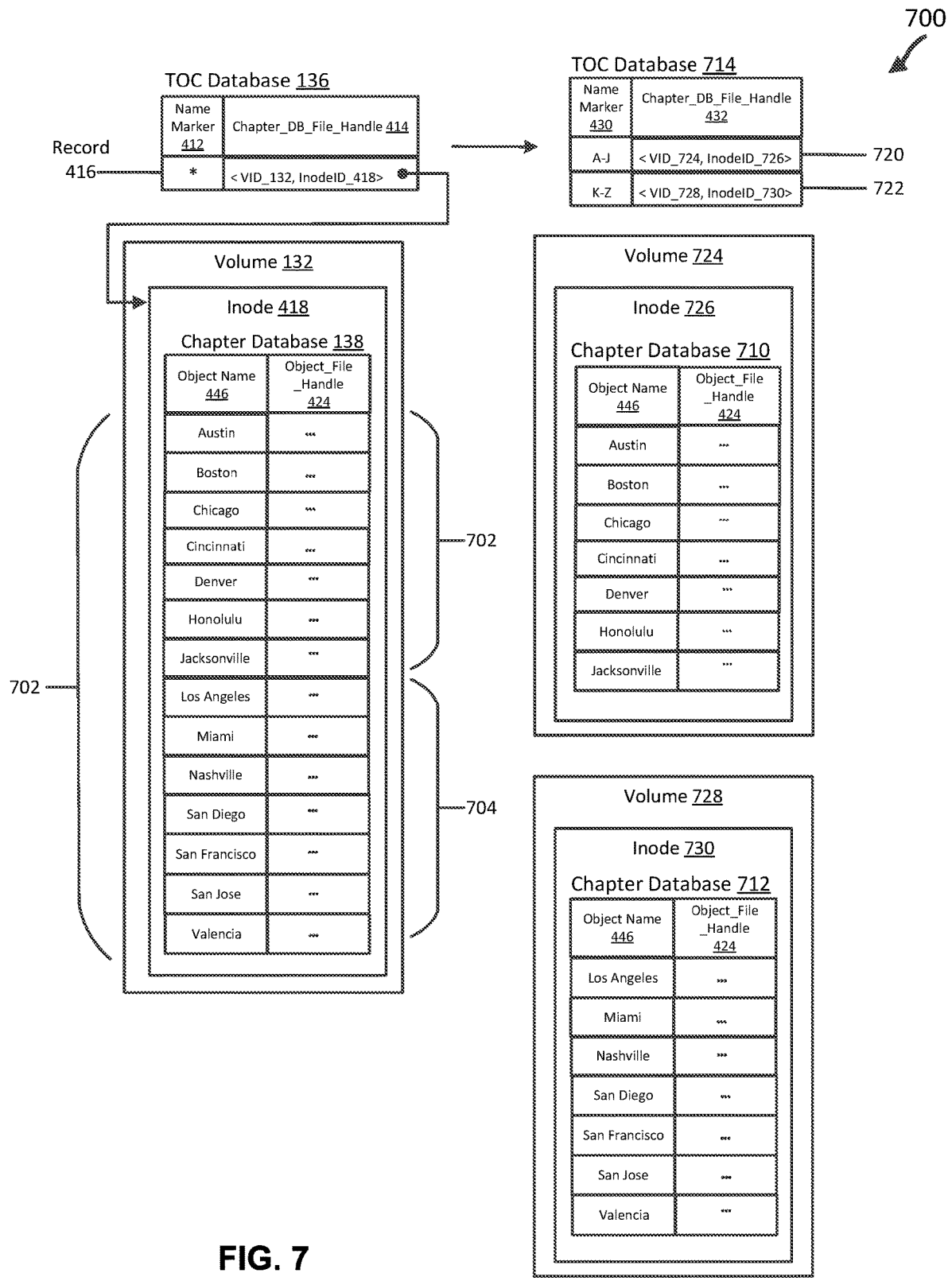
FIG. 7 is a block diagram illustrating a chapter database split into two partitioned chapter databases in accordance with one or more aspects of the present disclosure.

FIG. 7 will be discussed relative to FIG. 6 (and vice versa) to better understand concepts related to splitting a chapter database into two partitioned chapter databases. FIG. 7 is a block diagram illustrating an object storage system 700 that splits a chapter database into two partitioned chapter databases in accordance with one or more aspects of the present disclosure. The object storage system 700 may be part of the clustered network environment 100 in FIG. 1. The object storage system 700 includes the TOC database 136 and the volume 132, as discussed in relation to FIG. 1.

Referring to FIG. 6, at block 602, the method 600 includes determining, by an object manager 160, that an original chapter database having a plurality of records satisfies a split threshold, the original chapter database being stored at a first location, and the original chapter database being referenced by a TOC database and covering a range of object names. In an example, a chapter database satisfies the split threshold if the chapter database includes more records than the split threshold. In another example, a chapter database satisfies the split threshold if the chapter database includes M more records than its peers, where M is a percentage greater than twenty-five (e.g., M is about thirty-three percent or about fifty percent). For example, the object manager 160 may determine that the original chapter database satisfies the split threshold if the size of the original chapter database is about thirty-three percent or larger than the size of its peers.

In some examples, the object manager 160 compares the number of records in a chapter database against the number of records in a TOC database. If a chapter database's record count is M percentage higher than the TOC's record count, then the object manager 160 may determine that the chapter database is too large and satisfies the split threshold. In FIG. 7, the TOC database 136 references the chapter database 138, which is stored as the inode 418 in the volume 132 and may cover the complete flat namespace associated with a client. The chapter database 138 includes a plurality of records 702 and may be an example of the original database, as discussed in relation to block 602. In an example, the split threshold may be ten records, and the chapter database 138 satisfies the split threshold if the chapter database 138 includes a greater number of records than the split threshold. In this example, the chapter database 138 satisfies the split threshold because the chapter database 138 includes fourteen records (more than ten records).

Referring to FIG. 6, at block 604, the method 600 includes partitioning, by the object manager 160, the plurality of records into a first subset of records and a second subset of records. The contents of the original chapter database are apportioned to the new partitioned databases. In an example, a midpoint record in the TOC database is selected, and all records below that midpoint are placed in a first chapter database and all records at or above that midpoint are placed in a second chapter database. The two partitioned chapter databases may be considered immediate siblings of each other within the object namespace, and together they occupy the same logical niche in the overall namespace as the original chapter database. The new partitioned databases are discussed further below.

For example, in FIG. 7, the object manager 160 may partition the plurality of records 702 into a first subset of records 704 and a second subset of records 706. The object manager 160 may partition the plurality of records in about half, with the first and second subsets of records including the same number of records or having at most one more record than the other. This is merely an example, and the object manager 160 may partition the plurality of records such that the first and second subsets of records have a difference of P records, where P is any number greater than one.

Referring to FIG. 6, at block 606, the method 600 includes storing, by the object manager 160, a first chapter database at a second location, the first chapter database including the first subset of records and covering a first subrange of the range of object names. In FIG. 7, a chapter database 710 may be an example of the first chapter database in block 606. The chapter database 710 includes the first subset of records 704 and covers a first subrange "A-J" of object names. The object manager 160 may determine that the second location is at an inode 726 within a volume 724. The object manager 160 may select the volume 724 for storage of the chapter database 710 because the volume 724 is, for example, underutilized and/or has a large amount of unused storage compared to other volumes in the cluster. In some examples, the first location and the second location are the same and are associated with the same volume. In some examples, the first location and the second location are different and are associated with different volumes.

Referring to FIG. 6, at block 608, the method 600 includes storing, by the object manager 160, a second chapter database at a third location, the second chapter database including the second subset of records and covering a second subrange of the range of object names. In FIG. 7, a chapter database 712 may be an example of the second chapter database in block 608. The chapter database 712 includes the second subset of records 706 and covers a second subrange "K-X" of object names. The object manager 160 may determine that the third location is at an inode 730 within a volume 728. The object manager 160 may select the volume 728 for storage of the chapter database 712 because the volume 728 is, for example, underutilized and/or has a large amount of unused storage compared to other volumes in the cluster. In some examples, the first location and the third location are the same and are associated with the same volume. In some examples, the first location and the third location are different and are associated with different volumes.

The object manager 160 may determine nodes and/or volumes that are underutilized and/or have a lot of unused storage. As the workload continues to evolve and more objects are added to the object storage system, chapter databases may grow. A large chapter database may be split into the first and second chapter databases, as discussed above in relation to blocks 604 and 606, and the object manager 160 may determine to store each of these chapter databases at volumes and/or data storage devices that are underutilized and/or have a lot of unused storage to keep the overall workload distributed about evenly among the nodes and volumes in the clustered network environment 100.

Referring to FIG. 6, at block 610, the method 600 includes updating, by the object manager 160, an original record in the TOC database that references the original chapter database to store a first name marker and a first chapter database file handle, the first name marker indicating the first subrange and the first chapter database file handle referencing the second location. In some examples, updating the original record in the TOC database may include removing the original record and inserting a record in the TOC database, the inserted record including the first name marker and the first chapter database file handle.

In FIG. 7, the chapter databases 710 and 712 may replace the chapter database 138. Collectively, the chapter databases 710 and 712 are responsible for the same range of object names for which the original chapter database is responsible. Before the chapter database 138 is split, the TOC database 136 references the chapter database 138. After the chapter database 138 is split, the object manager 160 may update the TOC database 136 to reference the chapter databases 710 and 712. The object manager 160 may update the record 416 in the TOC database 136 to a record 720, which stores a name marker "A-J" indicating a first subrange of object names and further stores a chapter database file handle <VID_724, InodeID_726> that references an inode 726 (identified by InodeID_726) in a volume 724 (identified by VID_724). The TOC database 136 may be updated to the TOC database 714. The chapter database 710 is stored at the inode 726 in the volume 724 and is referenced by the record 720 in the TOC database 714.

Referring to FIG. 6, at block 612, the method 600 includes inserting, by the object manager 160, a second record into the TOC database, the second record including a second name marker and a second chapter database file handle, the second name marker indicating the second subrange and the second chapter database file handle referencing the third location. In FIG. 7, after the chapter database 138 is split, the object manager 160 may insert a record 722 into the TOC database 714. The record 722 in the TOC database 714 includes a name marker "K-Z" indicating a second subrange of object names and further includes a chapter database file handle <VID_728, InodeID_730> that references an inode 730 (identified by InodeID_730) in a volume 728 (identified by VID_728). The chapter database 712 is stored at the inode 730 in the volume 728 and is referenced by the record 722 in the TOC database 714.

Referring to FIG. 6, at block 614, the method 600 includes deleting, by the object manager 160, the original chapter database. In FIG. 7, the two chapter databases 710 and 712 may replace the single chapter database 138. Accordingly, the object manager 160 may delete the chapter database 138.

Each of the first location at which the original chapter database was stored, the second location at which the first chapter database is stored, and the third location at which the second chapter database is stored may be located in the same volume or different volumes as each other and/or may be located in the same data storage device or different data storage devices as each other. The object manager 160 may determine, based on conditions of the clustered network environment 100, the first, second, and third locations. The conditions may include, for example, a function of the activity level of the overall cluster, storage load (amount of usage on each volume) of a volume, and the like.

For example, the object manager 160 may select, based on an activity level of a set of volumes, a volume of the set of volumes as being the first, second, and/or third location. By selecting a volume that is not as active as other volumes in the set for storing the chapter database, the volume's activity level may be increased and the volume may participate in processing the workload. Accordingly, such selection may assist in distributing the workload across the cluster.

In some examples, the object manager 160 may perform further actions to adjust the use of the split mechanism. For example, the object manager 160 may categorize a first set of chapter databases as red databases and categorize a second set of chapter databases as green databases. The type of categorizing (red, green, etc.) is by way of example only; other types of categorizations may be used for same effect herein. In an example, a red database does not accept new object names for storage. A red database instead splits itself into two partitioned chapter databases, each partitioned chapter database being categorized as a green database. A green database is ready to store new object names. If a green database grows and is split into two partitioned chapter databases, both of the partitioned chapter databases are categorized as red databases. Similar processes may be performed for merging chapter databases, if applicable.

Referring back to FIG. 7 as an example, the object manager 160 may categorize the chapter database 138 as a green database, which may be split into the two partitioned chapter databases 710 and 712. The object manager 160 may categorize each of the two partitioned chapter databases 710 and 712 as a red database that does not accept new objects/ object names. To use a red database, the object manager 160 may split the red database into two partitioned chapter databases that are categorized as green databases. For example, if the object manager 160 receives a request to store an object having an object name "Fort Lauderdale" into the object storage system, the object manager 160 may split the chapter database 710 into two partitioned chapter databases and categorize them as green databases. The object manager 160 may store the object name into the appropriate partitioned chapter database that covers a range of object names including "Fort Lauderdale" (e.g., "A-C"). Each of the two partitioned chapter databases may accept the storage of object names and may split and/or merge at a later point, as discussed in the present disclosure.

The use of the red and green categorization may provide for increased locality between the chapter database and the corresponding objects. For example, if an original chapter database is split in accordance with the red and green chapter database categorization, the original chapter database is effectively split into four partitioned chapter databases instead of the initial two partitioned chapter databases as discussed relative to FIG. 6.

Accordingly, the original chapter database is partitioned into the two red chapter databases (partitioned databases) and the two green chapter databases (partitioned databases), resulting in each of the partitioned databases being about half the size that it would otherwise be. At each stage, one partitioned chapter database may be allocated locally, and one partitioned chapter database may be allocated remotely. For example, when a large green chapter database is split into four smaller green chapter databases, two of those green chapter databases may still be located on the same volume (with one-hundred percent local content) as the objects referenced by the original chapter database and two of those green chapter databases may be located on a different volume (with zero percent local content) as the objects referenced by the original chapter database.

Each of the green chapter databases may be, for example, a quarter full and ready to absorb three times as much new content as it already contains. Accordingly, a green chapter database may grow substantially larger before splitting again. Before the green chapter database is split again, the object manager 160 may allocate inodes local to the chapter database for storing the new objects. Accordingly, the new content may be one hundred percent local to the objects. Accordingly, when these four new green databases (partitioned databases) have all become full, two of these green databases may contain one-hundred percent local content and the other two green databases may contain seventy-five percent local content—collectively representing 87.5% locality.

In some examples, when the object manager 160 splits an original chapter database into two partitioned chapter databases, it may be unnecessary to allocate one partitioned chapter database remotely. For example, under some circumstances, both partitioned chapter databases may be stored at inodes in the same volume as the one storing the objects, yielding one-hundred percent local content for both partitioned chapter databases. The object manager 160 may determine to store both partitioned chapter databases locally, for example, if the object manager 160 determines that the overall level of ingest activity on all nodes is very high (e.g., there is a good probability that other chapter databases will independently also choose to grow locally), keeping overall traffic distributed among all nodes.

In some examples, chapter databases may have a small number of records. When a chapter database becomes too small (e.g., by satisfying a merge threshold), it may be merged with another small chapter database. For example, the object manager 160 may compare the number of records included in a chapter database with the number of records included in the TOC database. If the object manager 160 determines that the chapter database's record count has less than a percentage threshold (e.g., about fifty percent or sixty-six percent) of the TOC database's record count, then the object manager 160 may determine to merge the chapter database with another chapter database. It should be understood that this is an example, and the object manager 160 may merge sibling database for other reasons. The merged chapter databases may be immediate siblings of each other within the namespace and may cover a consecutive and discrete range of object names. The object manager 160 may merge the two peer chapter databases together, create a combined chapter database, and write all the records from the two peer chapter databases into the combined chapter database. Accordingly, the object manager 160 may remove the two peer chapter databases from the object storage system and update the TOC database by removing those records containing references to the two peer chapter databases. Additionally, the object manager 160 may insert a new record including a name marker indicating a range of objects covered by both the peer chapter databases and further including a chapter database file handle that references the combined chapter database. After these actions, the TOC database includes one fewer record than before the merger.

Figure 8:
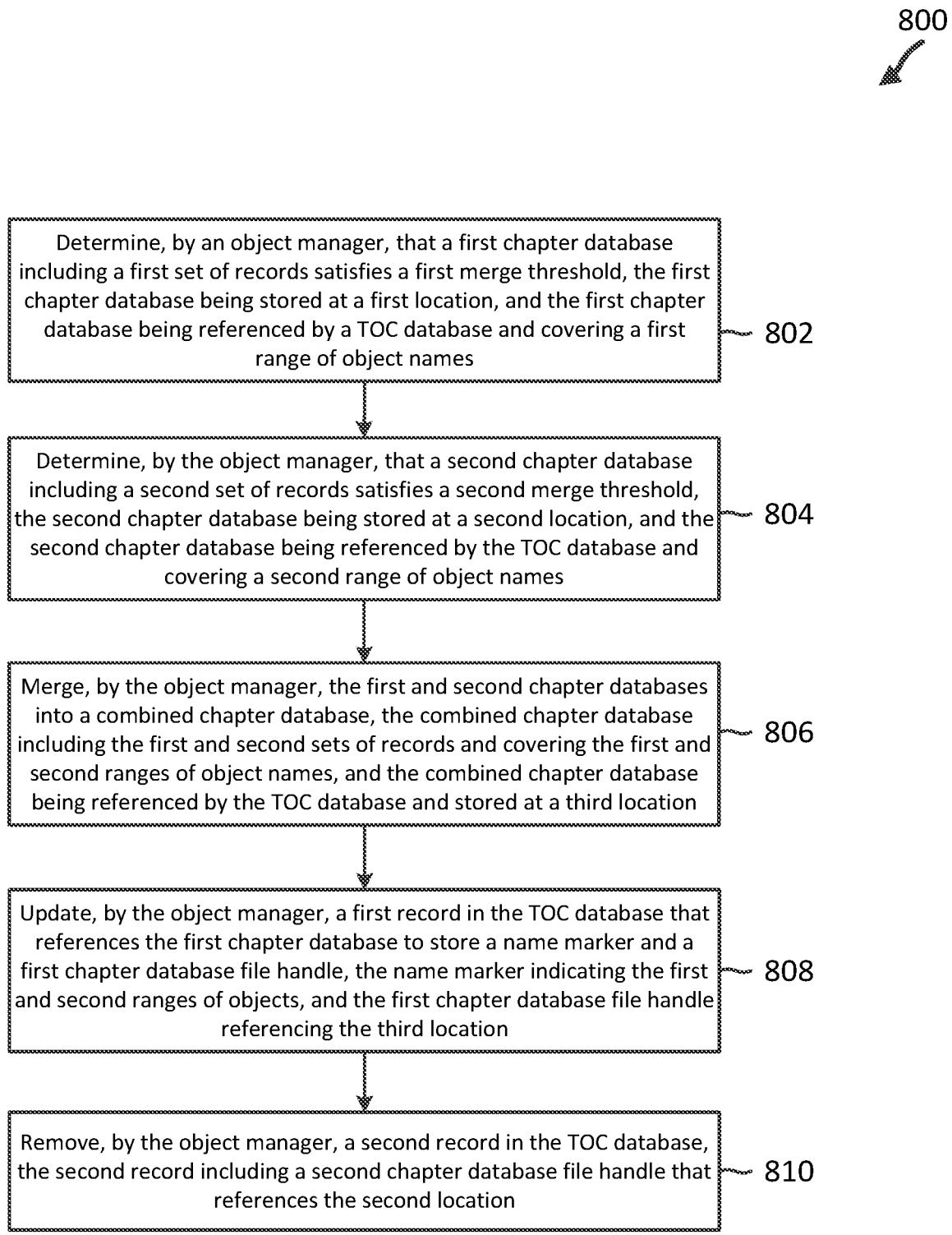
FIG. 8 is a flow diagram of a method of merging two peer chapter databases into a single chapter database in accordance with one or more aspects of the present disclosure.

FIG. 8 is a flow diagram of a method 800 of merging two peer chapter databases into a single combined chapter database in accordance with one or more aspects of the present disclosure. Blocks of the method 800 can be executed by a computing device (e.g., a processor, processing circuit, the storage operating system 208, the network adapter 210, the cluster access adapter 212, the storage adapter 214, and/or other suitable component, such as of the node 202 in FIG. 2). For example, the data storage system (e.g., data storage system 102, 104 in FIG. 1 or the data storage system 200 in FIG. 2) may utilize one or more components, such as the nodes 116, 118 in FIG. 1, the network modules 120, 122 in FIG. 1, the disk modules 124, 126 in FIG. 1, the data storage devices 128, 130 in FIG. 1, to execute the blocks of the method 800. As illustrated, the method 800 includes a number of enumerated blocks, but embodiments of the method 800 may include additional blocks before, after, and in between the enumerated blocks. In some embodiments, one or more of the enumerated blocks may be omitted or performed in a different order.

At block 802, the method 800 includes determining, by an object manager, that a first chapter database including a first set of records satisfies a first merge threshold, the first chapter database being stored at a first location, and the first chapter database being referenced by a TOC database and covering a first range of object names.

At block 804, the method 800 includes determining, by the object manager, that a second chapter database including a second set of records satisfies a second merge threshold, the second chapter database being stored at a second location, and the second chapter database being referenced by the TOC database and covering a second range of object names. The first and the second merge thresholds may be the same or different from each other.

At block 806, the method 800 includes merging, by the object manager, the first and second chapter databases into a combined chapter database, the combined chapter database including the first and second sets of records and covering the first and second ranges of object names, and the combined chapter database being referenced by the TOC database and stored at a third location. The object manager 160 may determine that the third location is at an inode within a volume that is underutilized and/or has a large amount of unused storage compared to other volumes in the cluster.

At block 808, the method 800 includes updating, by the object manager, a first record in the TOC database that references the first chapter database to store a name marker and a first chapter database file handle, the name marker indicating the first and second ranges of objects, and the first chapter database file handle referencing the third location. In some examples, updating the first record in the TOC database may include removing the first record and inserting a record in the TOC database, the inserted record including the name marker and the first chapter database file handle. For example, the first chapter database has been merged with the second chapter database, and the first record is no longer needed and accordingly is removed.

At block 810, the method 800 includes removing, by the object manager, a second record in the TOC database, the second record including a second chapter database file handle that references the second location. The second chapter database has been merged with the first chapter database, and the second record is no longer needed and accordingly is removed.

Each of the first location at which the first chapter database was stored, the second location at which the second chapter database was stored, and the third location at which the combined chapter database is stored may be located in the same volume or different volumes as each other and/or may be located in the same data storage device or different data storage devices as each other. The object manager 160 may determine, based on conditions of the clustered network environment 100, the first, second, and third locations. The conditions may include, for example, a function of the activity level of the overall cluster, storage load (amount of usage on each volume) of a volume, and the like.

For example, the object manager 160 may select, based on an activity level of a set of volumes, a volume of the set of volumes as being the first, second, and/or third location. By selecting a volume that is not as active as other volumes in the set for storing the chapter database, the volume's activity level may be increased and the volume may participate in processing the workload. Accordingly, such selection may assist in distributing the workload across the cluster.

Architecturally, it may be desirable for chapter databases to have approximately as many records as each other. If any chapter database has grown to the point where it is substantially larger than its peers, then there is a risk that this chapter database may become overly busy. For example, if a chapter database stores a larger percentage of object names than its peers, there is a greater probability that the chapter database will likewise receive a proportionally higher amount of work to do. Similarly, a large chapter database may represent a resiliency concern in that rebuilding a large database after a failure is more time-consuming that rebuilding a small database. A failure may occur, for example, if the chapter database has a problem with its index.

Likewise, it may be desirable for the TOC database to have approximately as many records as the chapter databases has and for similar reasons as discussed above. In some examples, the object manager 160 may desire to maintain a square root relationship between the TOC database and the chapter databases. For example, if the overall collective namespace includes N objects, then the object manager 160 may desire for the namespace to be stored among approximately sqrt(N) separate chapter databases, each containing approximately sqrt(N) object-name records. To illustrate with a numeric example, if the object storage system stores a million objects (1,000,000), the object manager 160 may determine that the TOC database should store approximately a thousand (1,000) records (the square root of one million is one thousand) and each chapter database should store approximately a thousand (1,000) records, resulting in all the databases in the object storage system being approximately the same size.

Some degree of variability from the square root relationship may apply to reduce the number of split and/or merge operations, which are typically expensive operations. For example, rather than split a chapter database when it reaches 1,000 records (as one example number of records), the object manager 160 may allow the chapter database to grow up to 1,500 records (as one example number of records), exceeding the square root relationship by a substantial margin. It may be desirable to allow an original chapter database to grow past the square root number (e.g., 1,000 records) to reduce the number of times a resulting partitioned chapter database is merged with another chapter database and/or give the original chapter database time to grow before the split. In another example, rather than merge two peer chapter databases when they reach below 500 records (as one example number of records), the object manager 160 may allow the chapter database to get down to fifty to seventy percent of the merge threshold, before merging the chapter database with another chapter database. For example, once the two peer chapter databases are merged into a combined chapter database, it may be likely that the combined chapter database satisfies the split threshold.

A record may be inserted into the TOC database when a chapter database grows large enough to be split into two peer chapter databases, and a record may be removed from the TOC database when two chapter databases are merged into a single chapter database. Accordingly, the TOC database may be slow to change, and it may be desirable for a network module (e.g., the network module 120 in FIG. 1) to cache records from the TOC database to assist the network module efficiency process future requests associated with objects.

The split and merger operations discussed, for example, in relation to FIGS. 6, 7, and 8 may be expensive operations that occur with less frequency as the overall namespace grows. For example, a database with ten billion objects may have approximately 100,000 separate chapter databases, each with approximately 100,000 records. The object manager 160 may determine to not split a chapter database unless it grows to a record threshold (e.g., about 130,000 to about 150,000 records) having a significant amount of new content. While a smaller namespace (e.g., one with about 10,000 names) may have only about one hundred chapter databases, each including one hundred records, the object manager 160 may split the chapter database again after receiving, for example, thirty new object names. To constrain the costs of these divisions when the namespace is small, the object manager 160 may restrict a chapter database from splitting until it has at least about a first threshold number (e.g., about 1,000) of object names. Additionally or alternatively, to constrain the costs of these mergers, the object manager 160 may restrict chapter databases from merging until they have fall below a second number (e.g., about 500) of object names. In this way, the object manager 160 may limit the number of split and merge operations that a small namespace database would normally suffer, in circumstances where the collective namespace is small enough that a single chapter database may be capable of accomplishing all namespace-related tasks on its own. For example, a 1,000-record database may easily stay in a node's memory and may be manipulated very quickly.

In some examples, a host device may transmit a request to the data storage system to perform an operation on an object stored in the object storage system. The TOC database and the one or more chapter databases referenced by the TOC database may enable the object storage system to maintain objects and the names that identify them in an efficient and effective manner.

Figure 9:
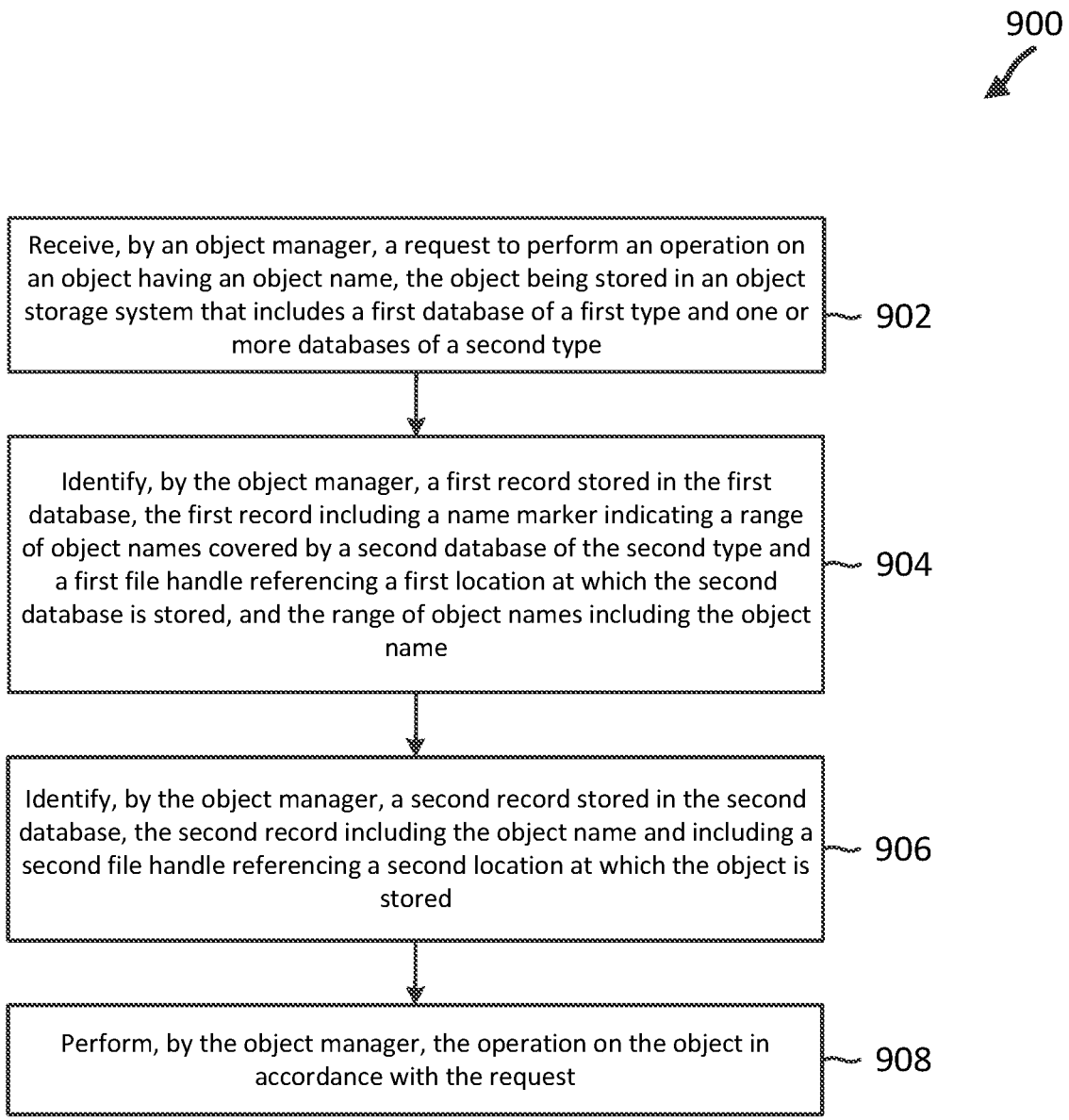
FIG. 9 is a flow diagram of a method of performing an operation on an object in accordance with one or more aspects of the present disclosure.

FIG. 9 is a flow diagram of a method 900 of performing an operation on an object in accordance with one or more aspects of the present disclosure. Blocks of the method 900 can be executed by a computing device (e.g., a processor, processing circuit, the storage operating system 208, the network adapter 210, the cluster access adapter 212, the storage adapter 214, and/or other suitable component, such as of the node 202 in FIG. 2). For example, the data storage system (e.g., data storage system 102, 104 in FIG. 1 or the data storage system 200 in FIG. 2) may utilize one or more components, such as the nodes 116, 118 in FIG. 1, the network modules 120, 122 in FIG. 1, the disk modules 124, 126 in FIG. 1, the data storage devices 128, 130 in FIG. 1, to execute the blocks of the method 900. As illustrated, the method 900 includes a number of enumerated blocks, but embodiments of the method 900 may include additional blocks before, after, and in between the enumerated blocks. In some embodiments, one or more of the enumerated blocks may be omitted or performed in a different order.

FIG. 5 will be discussed relative to FIG. 9 (and vice versa) to better understand concepts related to performing an operation on an object in an object storage system.

In FIG. 9, at block 902, the method 900 includes receiving, by an object manager 160, a request to perform an operation on an object having an object name, the object being stored in an object storage system that includes a first database of a first type and one or more databases of a second type. The first type may be a TOC database, and the second type may be a chapter database. The first database may be a cache storing one or more records from the TOC database. In FIG. 5, the network module 120 may receive the request to perform the operation. The operation may be, for example, a write operation that writes data to the object, a read operation that reads data from the object, or a delete operation that deletes the object from the object storage system.

Referring to FIG. 9, at block 904, the method 900 includes identifying, by the object manager, a first record stored in the first database, the first record including a name marker indicating a range of object names covered by a second database of the second type and a first file handle referencing a first location at which the second database is stored, and the range of object names including the object name. In FIG. 5, the network module 120 may search the TOC database 136 for a record including a name marker that indicates a range of object names including the object name. The record 516 includes a name marker "*", which indicates that the corresponding chapter database 138 covers the range of object names including the object name. The chapter database file handle references a location at which the chapter database 138 is stored. Based on the location, the network module 120 may determine that the chapter database 138 is stored at the data storage device 130.

In some examples, the network module 120 may be unable to access a data storage device or a chapter database without an intermediary (e.g., a disk module that is coupled to and accesses the chapter database). In FIG. 5, the network module 120 may determine that the disk module 126 accesses the data storage device 130 and accordingly may transmit the request to perform the operation to the disk module 126.

Referring to FIG. 9, at block 906, the method 900 includes identifying, by the object manager, a second record stored in the second database, the second record including the object name and including a second file handle referencing a second location at which the object is stored. In FIG. 5, a record 530 in the chapter database 138 includes the object name 406 ("OBName_406") of the object 404 and an object file handle <VID_134, InodeID_526> that references the object 404. The record 530 may correspond to the second record stored in the second chapter database.

At block 908, the method 900 includes performing, by the object manager, the operation on the object in accordance with the request. For example, if the operation is a write operation, the corresponding disk module may write data to the object. If the operation is a read operation, the corresponding disk module may read data from the object. If the operation is a delete operation, the corresponding disk module may delete data from the object. If the operation is a delete operation, the corresponding disk module may remove the object from the object storage system.

The present embodiments can take the form of an entirely hardware embodiment, an entirely software embodiment, or an embodiment containing both hardware and software elements. Accordingly, it is understood that any operation of the computing systems of computing architecture 100 may be implemented by the respective computing system using corresponding instructions stored on or in a non-transitory computer readable medium accessible by the processing system. For the purposes of this description, a tangible computer-usable or computer-readable medium can be any apparatus that can store the program for use by or in connection with the instruction execution system, apparatus, or device. The medium may include non-volatile memory including magnetic storage, solid-state storage, optical storage, cache memory, and RAM.

Thus, the present disclosure provides a system, method, and machine-readable storage medium for processing an operation on an object in a clustered networking environment. In some embodiments, the method includes receiving, by an object manager, a request to perform an operation on an object having an object name, the object being stored in an object storage system that includes a first database of a first type and one or more databases of a second type; identifying, by the object manager, a first record stored in the first database, the first record including a name marker indicating a range of object names covered by a second database of the second type and a first file handle referencing a first location at which the second database is stored, and the range of object names including the object name; identifying, by the object manager, a second record stored in the second database, the second record including the object name and including a second file handle referencing a second location at which the object is stored; and performing, by the object manager, the operation on the object in accordance with the request.

In some examples, the operation may be at least one of a write operation, a read operation, or a delete operation. In some examples, the method also includes storing the object at the second location in response to a request to store the object in the object storage system. In some examples, the method also includes partitioning the second database storing a plurality of records into a third database and a fourth database in response to a determination that a size of the second database exceeds a split threshold, the third database storing a first subset of the plurality of records, and the fourth database storing a second subset of the plurality of records. In some examples, the method also includes updating the first record in the first database in response to a determination that the second database has been partitioned into a third database and a fourth database, the updated first record including an updated name marker and an updated file handle, the updated name marker indicating that the third database of the second type covers a subset of the range of object names, and the updated file handle referencing a third location at which the third database is stored.

In some examples, the method also includes inserting a third record into the first database in response to a determination that the second database has been partitioned into a third database and a fourth database, the third record including a second name marker and a third file handle, the second name marker indicating that the third database covers a subset of the range of object names, and the third file handle referencing a third location at which the third database is stored. In some examples, the one or more databases of the second type represents a flat namespace storing one or more object names. In some examples, the second database and the object are stored at a same volume.

In yet further embodiments, the non-transitory machine-readable medium has instructions for performing the method of processing an operation on an object, including machine executable code, which when executed by at least one machine, causes the machine to: receive, by an object manager, a request to perform the operation on the object having an object name, wherein an object storage system includes a first database of a first type and a second database of a second type; search, by the object manager, the first database for a first record including a name marker and a first file handle, the name marker indicating a range of object names covered by the second database, the first file handle referencing the second database, and the range of object names including the object name; search, by the object manager, the second database for a second record including the object name and including a second file handle, the second file handle referencing the object; and perform, by the object manager, the operation on the object in accordance with the request.

In some examples, the operation is at least one of a write operation, a read operation, or a delete operation. In some examples, the second database and the object are stored at a common volume. In some examples, the non-transitory machine-readable medium has instructions for performing the method of processing an operation on an object, including machine executable code, which when executed by at least one machine, causes the machine to merge the second database with a third database to create a fourth database in response to a determination that a size of the second database is less than a first merge threshold and a size of the third database is less than a second merge threshold. The first and second merge thresholds may be the same or different from each other. In some examples, the non-transitory machine-readable medium has instructions for performing the method of processing an operation on an object, including machine executable code, which when executed by at least one machine, causes the machine to partition the second database storing a plurality of records into a third database and a fourth database in response to a determination that a size of the second database exceeds a split threshold, wherein the third database stores a first subset of the plurality of records, and the fourth database stores a second subset of the plurality of records. In some examples, the non-transitory machine-readable medium has instructions for performing the method of processing an operation on an object, including machine executable code, which when executed by at least one machine, causes the machine to remove the second database from the object storage system after the second database is partitioned into a third database and a fourth database.

In yet further embodiments, the computing device includes a memory containing a machine-readable medium comprising machine executable code having stored thereon instructions for performing a method of storing an object in an object storage system and a processor coupled to the memory. The processor is configured to execute the machine executable code to: receive, by an object manager, a request to store the object in the object storage system, the object have an object name, and the object storage system including a first database of a first type and one or more databases of a second type; identify, by the object manager, a first record stored in the first database, the first record including a name marker indicating a range of object names covered by a second database of the second type and a chapter database file handle referencing a first location at which the second database is stored, and the range of object names including the object name; store, by the object manager, the object at a second location; and insert, by the object manager, a second record into the second database, the second record including the object name and an object file handle, and the object file handle referencing the second location.

In some examples, the processor may be configured to execute the machine executable code to allocate, by the object manager, storage at the second location for storing the object. In some examples, the second database and the object are stored at different inodes within a same volume. In some examples, the second database and the object are stored at different volumes. In some examples, the one or more databases of the second type represents a flat namespace storing one or more object names.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
   receiving, by an object manager, a request to perform an operation on an object having an object name, the object being stored in an object storage system that includes a first database of a first type and one or more databases of a second type;
   identifying, by the object manager, a first record stored in the first database, the first record including a name marker indicating a range of object names covered by a second database of the second type and a first volume identifier referencing a first volume and a first inode, within the first volume, indicating a first location at which the second database is stored, and the range of object names including the object name;
   identifying, by the object manager, a second record stored in the second database, the second record including the object name and including a second volume identifier referencing a second volume and a second inode, within the second volume, indicating a second location at which the object is stored; and
   performing, by the object manager, the operation on the object in accordance with the request.

2. The method of claim 1, wherein the operation is at least one of a write operation, a store operation, a read operation, or a delete operation.

3. The method of claim 1, further comprising:
   caching, by the object manager, one or more records of a table-of-contents (TOC) database into the first database.

4. The method of claim 1, further comprising:
   merging the second database with a third database to create a fourth database in response to a determination that a size of the second database is less than a first merge threshold and a size of the third database is less than a second merge threshold, the third database and the fourth database being of the second type.

5. The method of claim 1, further comprising:
   partitioning the second database storing a plurality of records into a third database and a fourth database in response to a determination that a size of the second database exceeds a split threshold, the third database storing a first subset of the plurality of records, and the fourth database storing a second subset of the plurality of records.

6. The method of claim 1, further comprising:
   updating the first record in the first database in response to a determination that the second database has been partitioned into a third database and a fourth database, the updated first record including an updated name marker and an updated volume identifier file handle, the updated name marker indicating that the third database of the second type covers a subset of the range of object names, and the updated volume identifier file handle referencing a third location at which the third database is stored.

7. The method of claim 1, further comprising:
   inserting a third record into the first database in response to a determination that the second database has been partitioned into a third database and a fourth database, the third record including a second name marker and a third volume identifier file handle, the second name marker indicating that the third database covers a subset of the range of object names, and the third volume identifier file handle referencing a third location at which the third database is stored.

8. The method of claim 1, wherein the one or more databases of the second type represents a flat namespace storing one or more object names.

9. The method of claim 1, wherein the first database is a cache.

10. A non-transitory machine-readable medium having stored thereon instructions for performing a method of processing an operation on an object, comprising machine executable code which when executed by at least one machine, causes the machine to:
    receive, by an object manager, a request to perform the operation on the object having an object name, wherein an object storage system includes a first database of a first type and a second database of a second type;
    search, by the object manager, the first database for a first record including a name marker and a first volume identifier, the name marker indicating a range of object names covered by the second database, the first volume identifier referencing a first volume and a first inode, within the first volume, indicating a first location of the second database, and the range of object names including the object name;
    search, by the object manager, the second database for a second record including the object name and including a second volume identifier, the second volume identifier referencing a second volume including the object; and
    perform, by the object manager, the operation on the object in accordance with the request.

11. The non-transitory machine-readable medium of claim 10, wherein the operation is at least one of a write operation, a read operation, a store operation, or a delete operation.

12. The non-transitory machine-readable medium of claim 10, wherein the second database and the object are stored at a common volume.

13. The non-transitory machine-readable medium of claim 10, further comprising code, which causes the machine to:
merge the second database with a third database to create a fourth database in response to a determination that a size of the second database is less than a first merge threshold and a size of the third database is less than a second merge threshold.

14. The non-transitory machine-readable medium of claim 10, further comprising code, which causes the machine to:
partition the second database storing a plurality of records into a third database and a fourth database in response to a determination that a size of the second database exceeds a split threshold, wherein the third database stores a first subset of the plurality of records, and the fourth database stores a second subset of the plurality of records.

15. The non-transitory machine-readable medium of claim 10, further comprising code, which causes the machine to:
remove the second database from the object storage system after the second database is partitioned into a third database and a fourth database.

16. A computing device comprising:
a memory containing a machine-readable medium comprising machine executable code having stored thereon instructions for performing a method of storing an object in an object storage system; and
a processor coupled to the memory, the processor configured to execute the machine executable code to:
receive, by an object manager, a request to store the object in the object storage system, the object have an object name, and the object storage system including a first database of a first type and one or more databases of a second type;
identify, by the object manager, a first record stored in the first database, the first record including a name marker indicating a range of object names covered by a second database of the second type and a chapter database volume identifier referencing a first volume and a first inode, within the first volume, indicating a first location at which the second database is stored, and the range of object names including the object name;
store, by the object manager, the object at a second location; and
insert, by the object manager, a second record into the second database, the second record including the object name and an object volume identifier, and the object volume identifier referencing the second volume and a second inode, within the second volume, indicating a second location.

17. The computing device of claim 16, wherein the processor is configured to execute the machine executable code to:
allocate, by the object manager, storage at the second location for storing the object.

18. The computing device of claim 16, wherein the processor is configured to execute the machine executable code to:
cache, by the object manager, one or more records of a table-of-contents (TOC) database into the first database.

19. The computing device of claim 16, wherein the second database and the object are stored at different volumes.

20. The computing device of claim 16, wherein the one or more databases of the second type represents a flat namespace storing one or more object names.

* * * * *